United States Patent
Kawamoto et al.

(10) Patent No.: US 6,835,482 B2
(45) Date of Patent: Dec. 28, 2004

(54) FUEL REFORMING APPARATUS FOR POLYMER ELECTROLYTE MEMBRANE FUEL CELL

(75) Inventors: Koichi Kawamoto, Yokohama (JP); Masatoshi Tanaka, Tokyo (JP); Michizo Miyoshi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 10/391,581

(22) Filed: Mar. 20, 2003

(65) Prior Publication Data

US 2003/0161768 A1 Aug. 28, 2003

Related U.S. Application Data

(63) Continuation of application No. PCT/JP01/08206, filed on Sep. 20, 2001.

(30) Foreign Application Priority Data

Sep. 20, 2000 (JP) .............................. 2000-286022

(51) Int. Cl.$^7$ .............................................. H01M 8/18
(52) U.S. Cl. .............................. 429/19; 429/13; 429/26; 422/188; 422/198; 422/211; 48/94

(58) Field of Search .............................. 429/19, 13, 26; 422/188, 198, 211; 48/94

(56) References Cited

FOREIGN PATENT DOCUMENTS

| EP | 0 861 802 A2 | 9/1998 |
|----|--------------|--------|
| JP | 7-126001 | 5/1995 |
| JP | 7-133101 | 5/1995 |

*Primary Examiner*—Randy Gulakowski
*Assistant Examiner*—Gentle E. Winter
(74) *Attorney, Agent, or Firm*—Oblon, Spivak, McClelland, Maier & Neustadt, PC

(57) ABSTRACT

A fuel reforming apparatus for a polymer electrolyte membrane fuel cell, characterized in that each of a reformer, a carbon monoxide converter, a carbon monoxide selective oxidizing reactor, a cooling device for cooling the inlet port of the carbon monoxide converter, and a cooling device for cooling the inlet gas of the carbon monoxide selective oxidizing reactor is formed cylindrical, the reformer is arranged in the center, the carbon monoxide converter is arranged on the outer circumferential portion of the reformer, and the carbon monoxide selective oxidizing reactor is arranged on the outer circumferential portion of the carbon monoxide converter so as to make reformer, transformer and reactor integral.

15 Claims, 20 Drawing Sheets

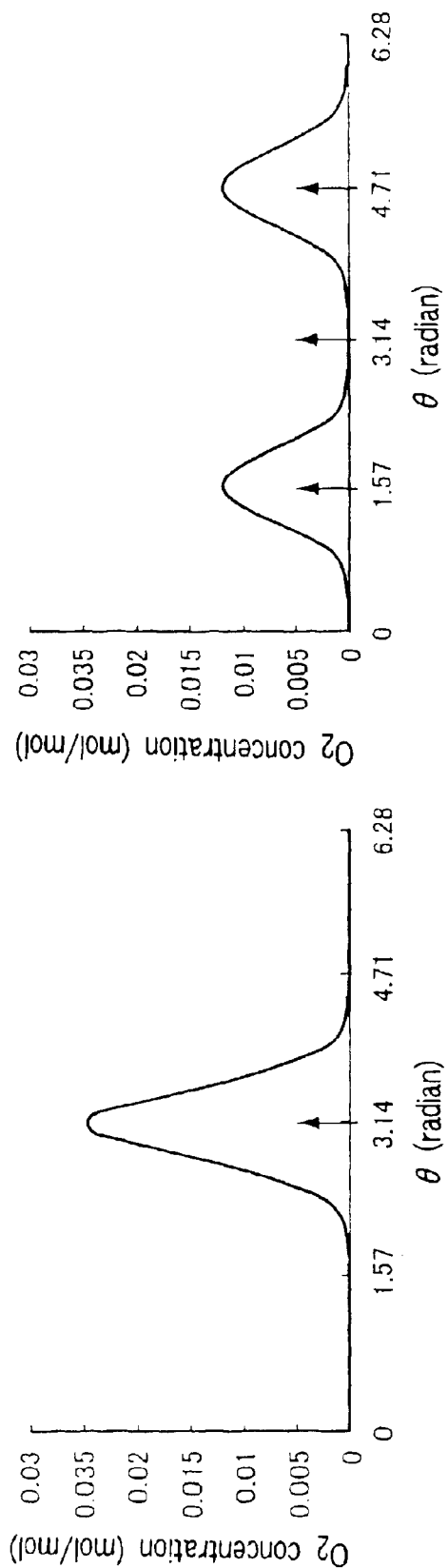
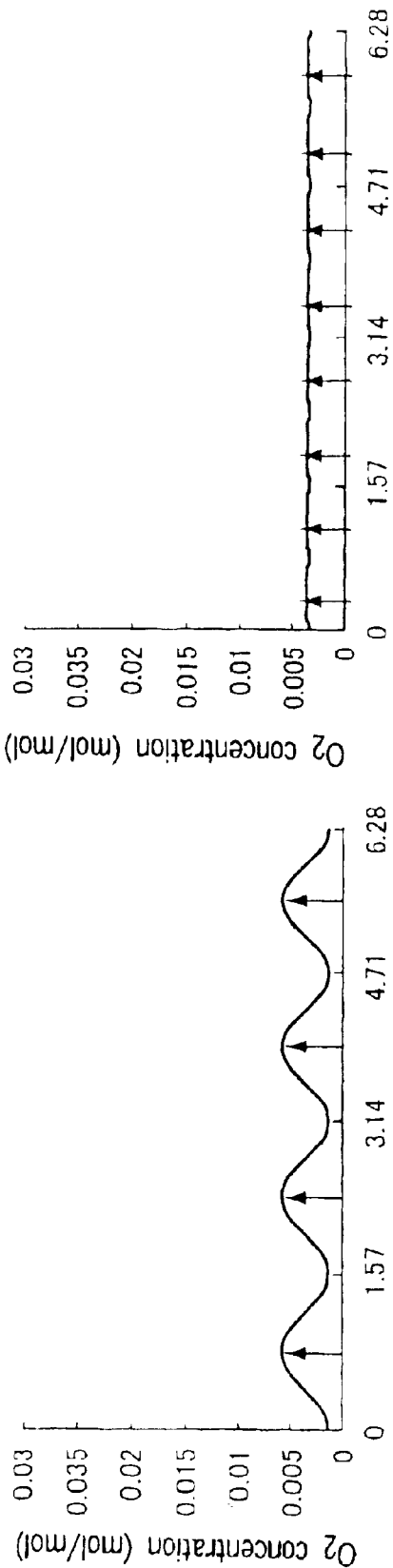
FIG. 3A
FIG. 3B
FIG. 3C
FIG. 3D

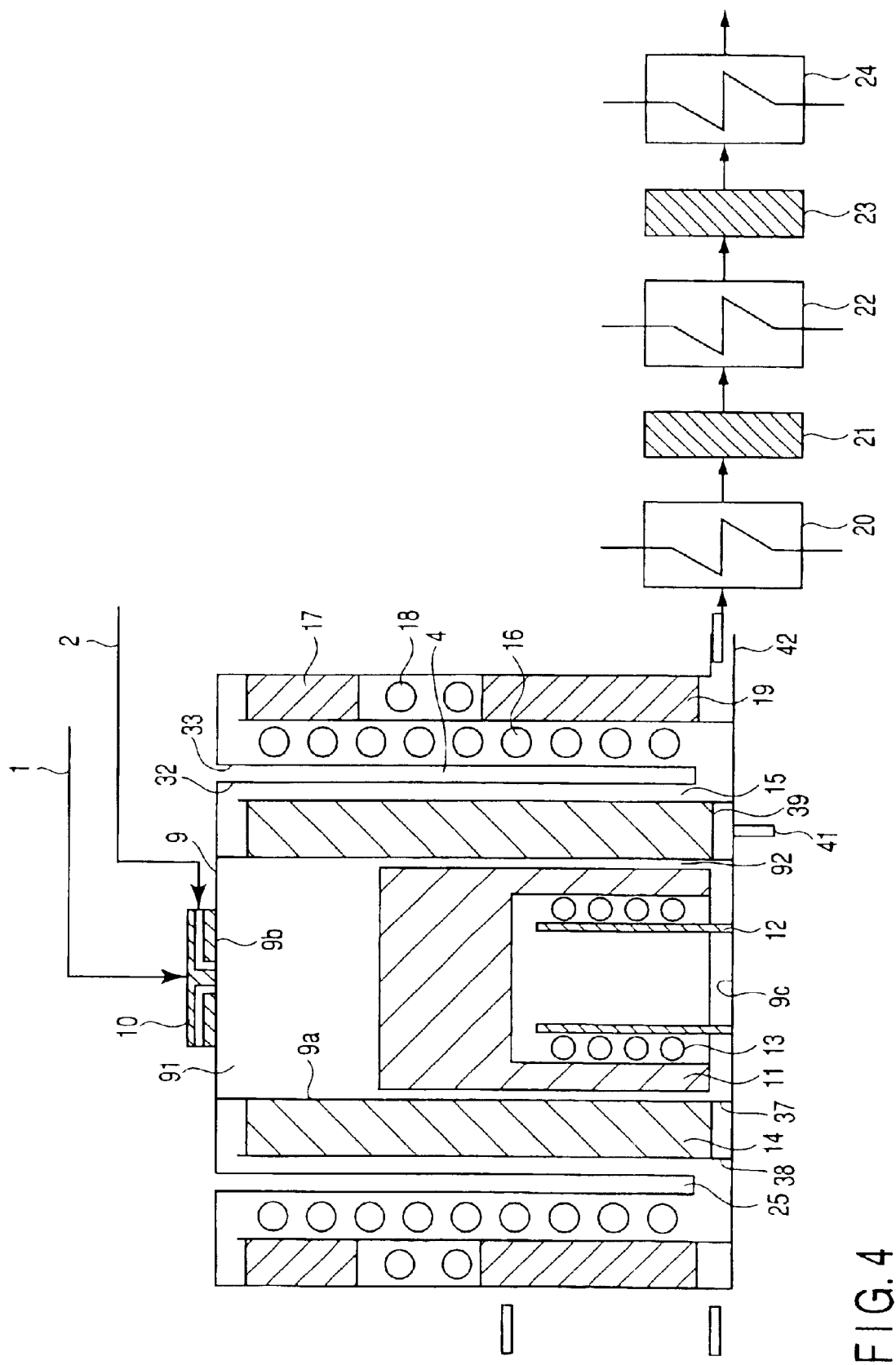

FUEL REFORMING APPARATUS FOR POLYMER ELECTROLYTE MEMBRANE FUEL CELL

CROSS-REFERENCE TO RELATED APPLICATIONS

This is a Continuation Application of PCT Application No. PCT/JP01/08206, filed Sep. 20, 2001, which was not published under PCT Article 21(2) in English.

This application is based upon and claims the benefit of priority from the prior Japanese Patent Application No. 2000-286022, filed Sep. 20, 2000, the entire contents of which are incorporated herein by reference.

BACKGROUND OF THE INVENTION

1. Field of the Invention

The present invention relates to a fuel reforming apparatus for a polymer electrolyte membrane fuel cell.

2. Description of the Related Art

FIG. 20 shows as an example the construction of a conventional fuel reforming apparatus for a polymer electrolyte membrane fuel cell. As shown in the drawing, the conventional fuel reforming apparatus comprises a reformer A, a carbon monoxide converter B and a carbon monoxide selective oxidation reactor C.

Steam 6, which is obtained as follows, is supplied into the reformer A. Specifically, water 5 within a gas-liquid separator 26 is introduced into an evaporator (steam generator) 13, and a water-steam mixture 4 obtained by partially evaporating the water is introduced into the gas-liquid separator 26 so as to separate the mixture 4 into water 7 and steam 6.

The steam 6 thus obtained is mixed with a reforming fuel 8 consisting of, for example, a natural gas in the reformer A, and the resultant mixture is introduced into a reforming catalyst layer 14 included in the reformer A. While the fuel 8 passes through the reforming catalyst layer 14, a so-called "reforming reaction" to form hydrogen ($H_2$), carbon monoxide (CO) and carbon dioxide ($CO_2$) is carried out while the fuel 8 and the steam 6 pass through the reforming catalyst layer 14. Since the reforming reaction is an endothermic reaction, hydrogen remaining in the fuel (exhaust gas) of the fuel cell stack (not shown) is burned in a burner 10 attached to the reformer A so as to generate heat within a burner space chamber 9. The heat thus generated is transmitted to the reforming catalyst layer 14 within the reformer A so as to bring about the reforming reaction.

A center plug 11 for forming a radiation heat transmitting section 91 utilizing burner gas of a high temperature and a convection heat transmitting section 92 utilizing burner gas of a high and intermediate temperature is arranged within the burner space chamber 9.

It should be noted that, in the fuel reforming apparatus of the polymer electrolyte membrane fuel cell, it is necessary to remove carbon monoxide formed by the reforming reaction because carbon monoxide markedly impairs the performance of the fuel cell stack even if carbon monoxide is contained in a very small amount. Such being the situation, the carbon monoxide converter B comprising a carbon monoxide converting catalyst layer 27 and a cooling device 28 buried in the carbon monoxide converting catalyst layer 27 and formed of a heat transmitting tube wound in, for example, a spiral form is arranged downstream of the reformer A in the conventional fuel reforming apparatus of the polymer electrolyte membrane fuel cell.

A reaction is carried out between carbon monoxide and steam within the carbon monoxide converting catalyst layer 27 so as to form hydrogen and carbon dioxide. Since this reaction is an exothermic reaction, the cooling device 28 is buried in the catalyst layer 27 so as to remove the heat generated by the exothermic reaction.

It should also be noted that the fuel gas coming from the reforming catalyst layer 14 has a high temperature and, thus, the fuel gas noted above is not adapted for the transforming reaction of carbon monoxide. Such being the situation, a cooling device 16 for cooling the inlet gas of the carbon monoxide converter (cooling device arranged upstream of the carbon monoxide converting catalyst layer) is arranged upstream of the carbon monoxide converting catalyst layer 27. Also, in order to further remove carbon monoxide, which was left unreacted in the carbon monoxide converting catalyst layer 27, the carbon monoxide selective oxidation reactor C consisting of a carbon monoxide selective oxidation catalyst layer 29 and a cooling device 30 buried in the carbon monoxide selective oxidation catalyst layer 29 are arranged downstream of the carbon monoxide converter B.

The air 2 is mixed with the reformed gas before entering the carbon monoxide selective oxidation catalyst layer 29 and, thus, oxygen contained in the air selectively carries out the reaction with carbon monoxide within the carbon monoxide selective oxidation catalyst layer 29 so as to form carbon dioxide, with the result that the carbon monoxide concentration is lowered to 10 ppm or less. In this case, hydrogen also reacts with oxygen so as to form steam. However, it is possible to suppress the reaction of hydrogen by the function of the catalyst if the air amount and the temperature of the catalyst layer are adjusted at appropriate values.

The carbon monoxide selective oxidation reaction is an exothermic reaction and, thus, the cooling device 30 is buried in the catalyst layer 29 in order to remove the heat generated by the exothermic reaction and to maintain the temperature at an appropriate value. Also, the gas passing through the carbon monoxide converting catalyst layer 27 is not adapted for the carbon monoxide selective oxidation reaction if the gas noted above is allowed to flow directly into the carbon monoxide selective oxidation catalyst layer 29. Therefore, the cooling device 20 is mounted on the inlet port of the catalyst layer 29 for the carbon monoxide selective oxidation reaction so as to lower the temperature of the gas passing through the carbon monoxide converting catalyst layer 27 and, then, the gas with the lowered temperature is supplied into the catalyst layer 29 for the carbon monoxide selective oxidation.

As a method for combining and integrating the particular system for providing a single apparatus, a stacked type structure is proposed in, for example, a first prior art, i.e., Japanese Patent Disclosure No. 7-126001, and a second prior art, i.e., Japanese Patent Disclosure No. 7-133101. Each of these prior arts is directed to the case where, for example, methanol is used as raw fuel material. It is taught that the apparatuses such as a burner, a reformer, carbon monoxide converter, and a carbon monoxide selective oxidation reactor are successively stacked one upon the other so as to make it possible to utilize effectively the heat recovery in an evaporator, the endothermic reaction in the reformer, the exothermic reaction in each of the carbon monoxide converter and the carbon monoxide selective oxidation reactor in the case where the operating temperature in every apparatus is low and the temperature differences between the apparatuses is small such that the operating temperature of each of the reformer and the carbon monoxide converter is 200 to 300° C., the operating temperature of the carbon monoxide selective oxidation reactor is 150° C. and the operating temperature of the evaporator is 100 to 150° C. As a result, it is made possible to provide a reforming apparatus performing the function of steam-reforming, for example, methanol.

The body portion of the polymer electrolyte membrane fuel cell, in which electricity is generated by the reaction between hydrogen and oxygen carried out under a low temperature in the presence of a catalyst, can be made compact, compared with the body portion of another fuel cell, e.g., a phosphoric acid type fuel cell. In addition, since the operating temperature is low, the body portion of the polymer electrolyte membrane fuel cell is expected to be applied to, for example, a domestic power generating apparatus and an automatic vending machine.

However, in the conventional fuel reforming apparatus of the polymer electrolyte membrane fuel cell, the reactors included in the apparatus differ from each other in the required temperature level, as described above. Therefore, it was necessary to arrange individually the reformer, the cooling device at the inlet port of the carbon monoxide converter, the cooling device at the inlet port of the carbon monoxide selective oxidation reactor, and the carbon monoxide selective oxidation reactor and, then, to connect these apparatuses using pipes. Such being the situation, it was unavoidable for the fuel reforming apparatus to be rendered bulky.

It should also be noted that the carbon monoxide selective oxidation reactor is a reactor inherent in the fuel reforming apparatus of the fuel cell that is operated under a low temperature. Since it is necessary to use both the carbon monoxide selective oxidation reactor and the cooling device thereof, it was difficult to miniaturize the fuel reforming apparatus of the solid high molecular weight fuel cell.

Under the circumstances, to miniaturize the fuel reforming apparatus is one of the serious problems which must be solved for putting the polymer electrolyte membrane fuel cell to practical use. It should also be noted that the efficiency of the polymer electrolyte membrane fuel cell system must be prevented from being lowered by the improvement to miniaturize the system so as to require a larger amount of the fuel for obtaining the same amount of the power generation.

The combined integral type reforming apparatus for the fuel cell of the stacked type structure disclosed in prior art 1 and prior 2 referred to previously is formed on the assumption that a liquid fuel such as methanol is used as the raw fuel material. Therefore, the operating temperatures of the constituting apparatus are low and the difference in temperature between the constituting apparatus is small such that the operating temperature of each of the reformer and the carbon monoxide reactor is 200 to 300° C., the operating temperature of the carbon monoxide selective oxidation reactor is 150° C., and the operating temperature of the evaporator is 100 to 150° C. Such being the situation, the function as a reforming apparatus can be performed even if the system is made compact by employing the stacked type structure.

On the other hand, in the case where the raw fuel materials such as methane and propane are subjected to steam reforming, the operating temperature of the reformer is high and, in addition, the difference in temperature among the constituting apparatus is large such that the operating temperature of the reformer is 700 to 750° C., the operating temperature of the carbon monoxide converter is 200 to 300° C., and the carbon monoxide selective oxidation reactor is 150° C. Under the circumstances, if methane or propane is applied to the stacked type structure disclosed in, for example, prior art 1 and prior art 2, the amount of the heat migration from the reformer into the carbon monoxide converter or the carbon monoxide selective oxidation reactor tends to be rendered large so as to make it difficult to maintain the carbon monoxide converter and the carbon monoxide selective oxidation reactor at suitable temperatures.

In the stacked type structure, it is necessary to arrange a heat insulating layer or a cooling means between the reformer and the carbon monoxide converter or the carbon monoxide selective oxidation reactor in order to suppress the migration of heat. In the former case, i.e., arrangement of a heat insulating layer, the object of making the system compact is impaired. The object of making the system compact is also impaired in the latter case. In addition, system efficiency is impaired.

In the reforming apparatus disclosed in the prior arts referred to previously, the side surface of each of the reactors is brought into contact with the outer air atmosphere and, thus, a heat insulating layer is required for suppressing the heat dissipation. However, in order to suppress the heat dissipation from the reforming reactor that is operated at 700 to 750° C. to a level equal to that of another reactor, a heat insulating layer several times as much as the heat insulating layer for the other reactor is required so as to impair the object of making the apparatus compact. In addition, since the dissipated heat is not recovered, it is difficult to improve the thermal efficiency. Since the heat dissipation is increased with increase in the temperature of the reactor, the reduction of the thermal efficiency tends to be rendered prominent in, particularly, the case where methane or propane is used as the raw fuel material and, thus, the reforming reaction is carried out at a high temperature. It follows that required is a technology in which hydrogen and methane contained in the exhaust gas of the fuel cell is burned in the reformer having the highest operating temperature by using a burner so as to supply heat such that water is evaporated by the residual heat amount of the burner exhaust gas, and in which, cooling devices that permits setting the operating temperatures of the reformer, the carbon monoxide converter and the carbon monoxide selective oxidation reactor in the order mentioned are arranged for processing the gas on the process side of the reforming apparatus such that heat is effectively recovered by the cooling device and the heat dissipated from the reactor is also recovered so as to improve the efficiency of the system and permit making the system compact.

The present invention, which has been achieved to overcome the problems described above, is intended to provide a compact fuel reforming apparatus for a polymer electrolyte membrane fuel cell, which does not invite an increase in the required fuel consumption regardless of the raw fuel material.

BRIEF SUMMARY OF THE INVENTION

According to a first aspect of the present invention, which is intended to achieve the object described above, there is provided a fuel reforming apparatus for a polymer electrolyte membrane fuel cell, comprising a reformer, a carbon monoxide converter, a carbon monoxide selective oxidation reactor, a cooling device for cooling the inlet gas of the carbon monoxide converter, and a cooling device for cooling the inlet gas of the carbon monoxide selective oxidation reactor, characterized in that each of the reformer, the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor is formed cylindrical; the reformer is arranged in the center of the installing plane, the carbon monoxide converter is arranged on the installing plane in the outer circumferential portion of the reformer, and the carbon monoxide selective oxidation reactor is arranged on the installing plane in the outer circumferential portion of the carbon monoxide converter so as to make these apparatuses integral; the cooling device for cooling the inlet gas of the carbon monoxide converter is arranged on inlet side of the carbon monoxide converter; and the cooling device for cooling the inlet gas of the carbon monoxide selective oxidation reactor is arranged on the inlet side of the carbon monoxide selective oxidation reactor.

According to the first aspect of the present invention, the constituting devices of the fuel reforming apparatus are arranged such that the device having a high temperature level is arranged in the center, and the other devices are arranged around the device having a high temperature level so as to permit the temperature level to be gradually lowered from the center toward the outer region of the fuel reforming apparatus. As a result, the temperature gradient between the adjacent devices is diminished so as to minimize the heat migration between the adjacent devices. It follows that it is possible to combine and make integral the constituting devices so as to render the resultant fuel reforming apparatus compact even if the constituting devices arranged independently or separated from each other by a heat insulating material for preventing the heat dissipation are not connected to each other by pipes. In addition, it is possible to maintain the operating temperature of each reactor at an appropriate level. What should also be noted is that the heat transmitted from the reactor having a high inner temperature to the outside is utilized for maintaining the temperature of the reactor on the outside so as to improve the thermal efficiency.

According to a second aspect of the present invention, which is intended to achieve the object described above, there is provided a fuel reforming apparatus for a polymer electrolyte membrane fuel cell, comprising a reformer, a carbon monoxide converter, a carbon monoxide selective oxidation reactor, a cooling device for cooling the inlet gas of the carbon monoxide converter, and a cooling device for cooling the inlet gas of the carbon monoxide selective oxidation reactor, characterized in that each of the reformer, the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor is formed in the shape of a parallelepiped; the reformer, the carbon monoxide converter, the carbon monoxide selective oxidation reactor are arranged in the order mentioned and mounted on an installing plane; these reactors are combined and made integral; the cooling device for cooling the inlet gas of the carbon monoxide converter is arranged on the inlet side of the carbon monoxide converter; and the cooling device for cooling the inlet gas of the carbon monoxide selective oxidation reactor is arranged on the inlet side of the carbon monoxide selective oxidation reactor.

According to the second aspect of the present invention, the temperature gradient between the adjacent constituting devices of the fuel reforming apparatus is diminished so as to suppress the heat migration between the adjacent constituting devices. It follows that it is possible to combine and make integral the constituting devices of the fuel reforming apparatus so as to render the fuel reforming apparatus compact, even if the constituting devices separated from each other with a heat insulating material are not connected to each other by using pipes.

According to a third aspect of the present invention, which is intended to achieve the object described above, there is provided a fuel reforming apparatus for a polymer electrolyte membrane fuel cell, comprising a reformer, a carbon monoxide converter, a carbon monoxide selective oxidation reactor, a cooling device for cooling the inlet gas of the carbon monoxide converter, and a cooling device for cooling the inlet gas of the carbon monoxide selective oxidation reactor, characterized in that of the reformer is formed cylindrical; each of the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor is formed in the shape of a parallelepiped; the reformer, the carbon monoxide converter and the carbon monoxide selective oxidation reactor are arranged in the order mentioned and mounted on an installing plane such that the carbon monoxide converter and the carbon monoxide selective oxidation reactor are combined with the reformer so as to form an integral structure, the integral structure being for cooling the installing plane; the cooling device for cooling the inlet gas of the carbon monoxide converter is arranged on the inlet side of the carbon monoxide converter; and the cooling device for cooling the inlet gas of the carbon monoxide selective oxidation reactor is arranged on the inlet side of the carbon monoxide selective oxidation reactor.

According to the third aspect of the present invention, it is possible to thermally separate the reformer having a high temperature level from the other reactors having a relatively low temperature. Also, since the reformer is shaped cylindrical, it is possible to transmit effectively the heat generated from the burner arranged within the reformer to the reforming catalyst layer. Further, since the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor are shaped parallelepiped and combined to form an integral structure, it is possible to make compact the fuel reforming apparatus of the polymer electrolyte membrane fuel cell.

According to a fourth aspect of the present invention, which is intended to achieve the object given previously, there is provided a fuel reforming apparatus for a polymer electrolyte membrane fuel cell according to any one of the first to third aspects, characterized in that a steam generator for obtaining a reforming steam, which is supplied to the reformer, is combined with the reformer so as to form an integral structure.

According to the fourth aspect of the present invention, the steam generator is also combined with the reformer so as to make the fuel reforming apparatus more compact.

According to a fifth aspect of the present invention, which is intended to achieve the object given previously, there is provided a fuel reforming apparatus for a polymer electrolyte membrane fuel cell according to any one of the first to fourth aspects, characterized in that the steam generator is arranged within a combustion space container included in the reformer so as to be positioned in the vicinity of the outlet port of the burner exhaust gas.

According to the fifth aspect of the present invention, it is possible to make the steam generator integral with each of the reactors without obstructing the heat transmission of the burner gas and the catalyst layer in the reformer. As a result, it is possible to make the fuel reforming apparatus compact without inviting an increase in the consumption of the fuel.

According to a sixth aspect of the present invention, which is intended to achieve the object stated previously, there is provided a fuel reforming apparatus for a polymer electrolyte membrane fuel cell according to any one of the first to third aspects, characterized in that a carbon monoxide converting catalyst layer constituting a part of the construction of the carbon monoxide converter is arranged in a divided fashion, and a cooling device is arranged intermediate between the divided parts of the carbon monoxide converting catalyst layer.

According to a seventh aspect of the present invention, which is intended to achieve the object stated previously, there is provided a fuel reforming apparatus for a polymer electrolyte membrane fuel cell according to any one of the first to third aspects, characterized in that a catalyst layer for the carbon monoxide selective oxidation reaction, the catalyst layer constituting a part of the construction of the carbon monoxide selective oxidation reactor, is arranged in a divided fashion, and a cooling device is arranged intermediate between the divided parts of the catalyst layer for the carbon monoxide selective oxidation reaction.

According to the seventh aspect of the present invention, it is possible to render the temperature distribution uniform within the catalyst layer for the carbon monoxide selective oxidation reaction and to make the fuel reforming apparatus compact.

According to an eighth aspect of the present invention, which is intended to achieve the object given previously, there is provided a fuel reforming apparatus for a polymer electrolyte membrane fuel cell according to any one of the first to third aspects, characterized in that a cooling device is arranged downstream of a catalyst layer for the carbon monoxide selective oxidation reaction, the catalyst layer constituting a part of the construction of the carbon monoxide selective oxidation reactor, so as to be combined with the fuel reforming apparatus in a manner to form an integral structure.

According to the eighth aspect of the present invention, the portion that is locally heated to a high temperature within the catalyst layer is decreased, compared with the prior art in which the cooling is performed by burying a heat transmitting pipe within the catalyst layer. As a result, it is possible to decrease the amount of the catalyst to the minimum level required and to make the entire apparatus compact.

According to a ninth aspect of the present invention, which is intended to achieve the object given previously, there is provided a fuel reforming apparatus for a polymer electrolyte membrane fuel cell according to the first aspect, characterized in that an annular header provided with at least eight fine holes, which are arranged equidistantly, for supplying the air to a catalyst layer for the carbon monoxide selective oxidation, the catalyst layer constituting a part of the construction of the carbon monoxide selective oxidation reactor, is arranged outside the carbon monoxide selective oxidation reactor.

According to the ninth aspect of the present invention, it is possible to supply the air uniformly to the carbon monoxide selective oxidation reactor, even if the reformer, the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor are formed cylindrical and combined to form an integral structure. It follows that it is possible to make the fuel reforming apparatus compact.

According to a tenth aspect of the present invention, which is intended to achieve the object given previously, there is provided a fuel reforming apparatus for a polymer electrolyte membrane fuel cell according to the first aspect or the second aspect, characterized in that a clearance for the heat insulation is formed between the partition wall of the reformer and the partition wall of the carbon monoxide converter.

According to the tenth aspect of the present invention, even if the reformer, the carbon monoxide converter, the carbon monoxide selective oxidation reactor, the cooling device for cooling the inlet gas of the carbon monoxide converter, and the cooling device for cooling the inlet gas of the carbon monoxide selective oxidation reactor are formed cylindrical and combined to form an integral structure such that the reformer having a high temperature level and the carbon monoxide converter having a low temperature level are positioned adjacent to each other, it is possible to suppress the migration of heat between the two. Further, it is possible to absorb the difference in elongation between the reformer having a high temperature level and the carbon monoxide converter having a low temperature level, the difference in elongation being caused by the thermal expansion. As a result, it is possible to suppress the thermal stress so as to overcome the problem in terms of the construction and the mechanical strength. It follows that it is possible to miniaturize the fuel reforming apparatus.

According to an eleventh aspect of the present invention, which is intended to achieve the object stated previously, there is provided a fuel reforming apparatus for a polymer electrolyte membrane fuel cell according to any one of the first to third aspects, characterized in that the cooling medium of the cooling device for cooling the inlet gas of the carbon monoxide converter is provided by a mixture consisting of steam before entering the reformer and the fuel.

According to the eleventh aspect of the present invention, the reforming gas can be cooled and, at the same time, a mixture of steam and fuel is heated before the mixture is introduced into the reformer. As a result, it is possible to achieve heat recovery. It follows that it is possible to make the fuel reforming system compact without lowering the power generating efficiency of the fuel cell system.

According to a twelfth aspect of the present invention, which is intended to achieve the object stated previously, there is provided a fuel reforming apparatus for a polymer electrolyte membrane fuel cell according to the sixth aspect, characterized in that the carbon monoxide converter is divided into at least two parts, and the cooling medium of the cooling device arranged between the divided parts of the carbon monoxide converter is provided by the steam generated from a steam generator or a mixture of water and steam.

According to the twelfth aspect of the present invention, the heat recovery can be achieved by heating a mixture of water and steam so as to make it possible to render the fuel reforming system compact without lowering the power generating efficiency of the fuel cell system.

According to a thirteenth aspect of the present invention, which is intended to achieve the object given previously, there is provided a fuel reforming apparatus for a polymer electrolyte membrane fuel cell according to the seventh aspect, characterized in that the carbon monoxide selective oxidation reactor is divided into at least two parts, and the cooling medium of each of the inlet cooling device, the intermediate cooling device and the outlet cooling device of the divided carbon monoxide selective oxidation reactor is provided by a part of the cooling water for the fuel cell stack.

According to the thirteenth aspect of the present invention, it is unnecessary to newly prepare a cooling medium, and the heat recovery can be achieved. It follows that it is possible to render the fuel reforming apparatus compact without lowering the power generating efficiency of the entire fuel cell system.

BRIEF DESCRIPTION OF THE SEVERAL VIEWS OF THE DRAWING

FIGS. 3A to 3D are graphs each showing the number of holes for introducing the air for the carbon monoxide selective oxidation reaction and the degree of oxygen diffusion for the present invention;

FIG. 4 is a vertical cross-sectional view showing the fuel reforming apparatus for a polymer electrolyte membrane fuel cell according to a second embodiment of the present invention;

DETAILED DESCRIPTION OF THE INVENTION

Figure 1:
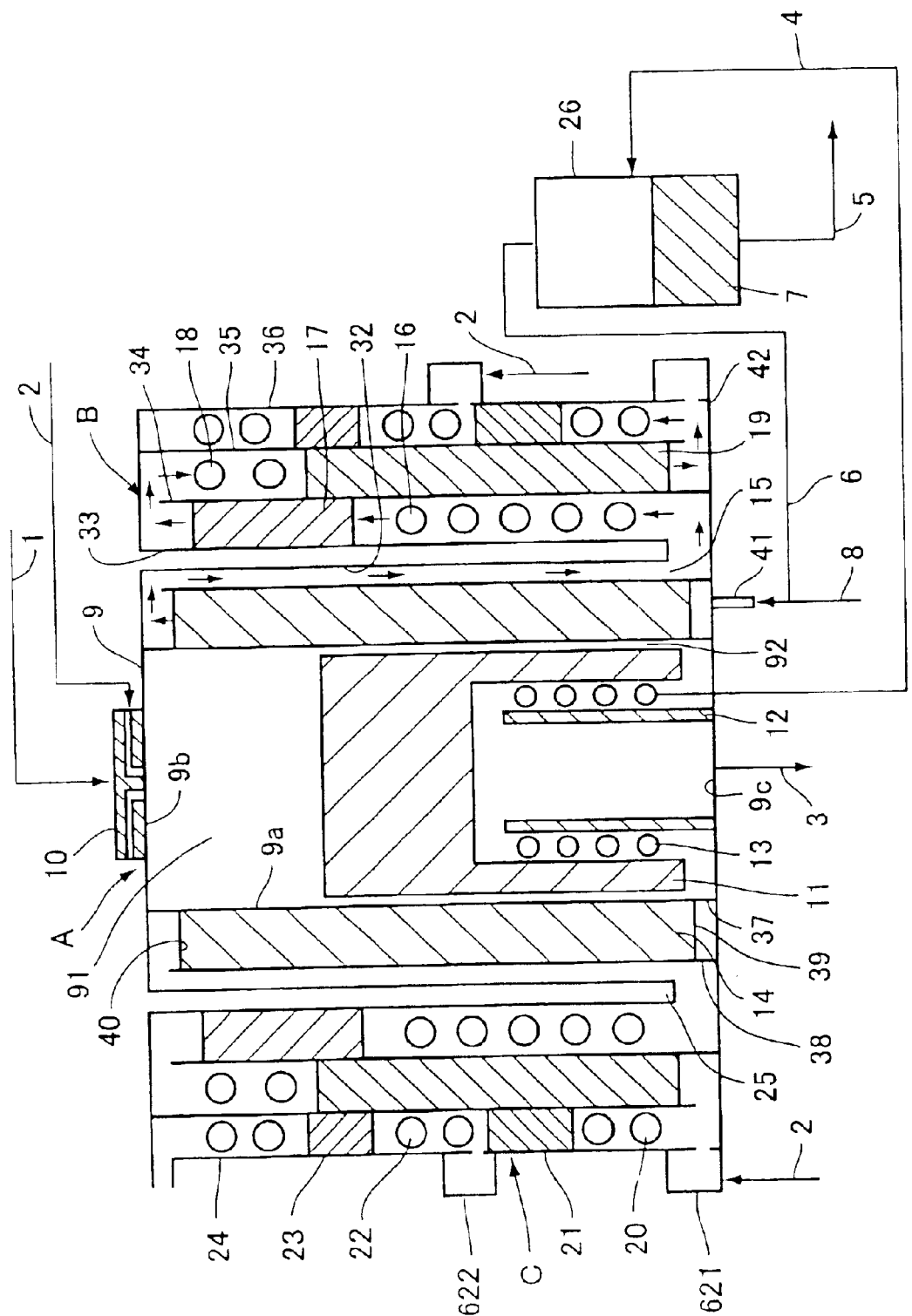
FIG. 1 is a vertical cross-sectional view showing the fuel reforming apparatus for a polymer electrolyte membrane fuel cell according to a first embodiment of the present invention.

FIG. 1 is a vertical cross-sectional view of a cylindrical apparatus for describing the fuel reforming apparatus for a polymer electrolyte membrane fuel cell according to a first embodiment of the present invention. As shown in the drawing, the fuel reforming apparatus of the present invention for a polymer electrolyte membrane fuel cell comprises a reformer A, a carbon monoxide converter B, a carbon monoxide selective oxidation reactor C, a cooling device 16 for cooling the inlet gas of the carbon monoxide converter B, and a cooling device 20 for cooling the inlet port of the carbon monoxide selective oxidation reactor C.

The reformer A comprises a burner space chamber 9 formed of a cylindrical body 9a having the upper and lower open end portions closed with a lid member 9b and a bottom member 9c, respectively, and having a radiation heat transmitting section 91 and a convection heat transmitting section 92 defined therein, a cylindrical partition wall 37 fixed on the outer circumferential surface of the cylindrical body 9a and positioned between the lid member 9b and the bottom member 9c, a cylindrical partition wall 38 fixed to the bottom member 9c on the side of the outer circumferential surface of the partition wall 37 a prescribed distance apart from the partition wall 37, a cylindrical reforming catalyst layer 14 arranged between the inner circumferential surface of the partition wall 38 and the outer circumferential surface of the partition wall 37, partition walls 39 and 40 arranged on the lower position and the upper position, respectively, of the reforming catalyst layer 14 and fixed to prescribed positions of the partition wall 38 and the partition wall 37, a gas inlet port 41 formed in a part of the lower end portion of the reforming catalyst layer 14 for introducing a reforming fuel 8 consisting of, for example, a natural gas and a reforming steam 6 into the reforming catalyst layer 14, and a cylindrical fluid passageway-forming member 32 provided with a cylindrical flange extending inward into the open portion on the side of one end portion and fixed to the lid member 9b to form a regeneration fluid passageway (regeneration chamber) 15 above the partition wall 40, in the clearance between the reforming catalyst layer 14 and the outer circumferential surface of the partition wall 38, and above the reforming catalyst layer 14 on the side opposite to the side on which the gas introducing port 41 is formed.

The fuel reforming apparatus for a polymer electrolyte membrane fuel cell also comprises a partition wall 33 provided with a flange arranged to form a clearance (heat insulating layer) 25 on the side of the outer circumferential surface of the fluid passageway-forming member 32 and extending toward the outer circumferential surface of a cylindrical body within the opening in one end portion of the cylindrical body, said partition wall 33 being joined to the lower end portion of the fluid passageway-forming member, a cooling device 16 for cooling the inlet gas of the carbon monoxide converter, said cooling device 16 being arranged on the lower side of the inner circumferential surface of the partition wall 33 and formed of, for example, a spirally wound heat transmitting pipe, a first stage carbon monoxide converting catalyst layer 17 arranged on the upper side of the inner circumferential surface of the partition wall 33, a cylindrical partition wall 34 arranged to cover the outer circumferential surfaces of the carbon monoxide converting catalyst layer 17 and cooling device 16 for cooling the inlet gas of the carbon monoxide converter and having one end portion fixed to a bottom member 42 joined to the bottom member 9c, an intermediate cooling device 18 for the carbon monoxide converting catalyst layer arranged on the upper side of the outer circumferential surface of the partition wall 34 and formed of, for example, a spirally wound heat transmitting pipe, a second stage carbon monoxide converting catalyst layer 19 arranged on the lower side of the outer circumferential surface of the partition wall 34, a cylindrical partition wall 35 arranged to cover the outer circumferential surfaces of the cooling device 18 and the carbon monoxide converting catalyst layer 19 and having one end portion fixed to the flange of the partition wall 33, a cylindrical cooling device 20 for cooling the inlet port of the carbon monoxide selective oxidation catalyst layer (a cooling device arranged in front of the carbon monoxide selective oxidation catalyst layer) in a manner to extend from the lower side toward the upper side along the outer circumferential surface of the partition wall 35, a cylindrical first stage carbon monoxide selective oxidation catalyst layer 21, a cylindrical intermediate cooling device 22 for the carbon monoxide selective oxidation catalyst layer, a cylindrical second stage carbon monoxide selective oxidation catalyst layer 23, a cylindrical cooling device 24 for cooling the outlet port of the carbon monoxide selective oxidation catalyst layer (a cooling device arranged downstream of the carbon monoxide selective oxidation catalyst layer), and a cylindrical partition wall 36 arranged to cover the outer circumferential surfaces of the cooling device 20, the carbon monoxide selective oxidation catalyst layer 21, the intermediate cooling device 22 for the carbon monoxide selective oxidation catalyst layer, the carbon monoxide selective oxidation catalyst layer 23 and the cooling device 24 and having both end portions fixed to the flange of the partition wall 33 and to the bottom member 42. It should be noted that air headers 621 and 622 are arranged on the outer circumferential surface of the partition wall 36 as described in the following.

Incidentally, each of the cooling devices 20, 22 and 24 is formed of, for example, a spirally wound heat transmitting pipe.

In this case, the carbon monoxide converter B consists of the carbon monoxide converting catalyst layer 17, the carbon monoxide converting catalyst layer 19 and the partition walls 33, 34 and 35. Also, the carbon monoxide selective oxidation reactor C consists of the carbon monoxide selective oxidation catalyst layers 21, 23 and the air headers 621, 622.

A center plug 11 having a cross section shaped like a Japanese letter "コ" is arranged within the burner space chamber 9, and a cylindrical partition wall 12 and an evaporator (steam generator) 13 are arranged in the space in the lower portion of the center plug 11. Also, a burner 10 is mounted to the lid member 9b in the upper portion of the burner space chamber 9. The air 2 is supplied by the burner 10 into a combustion fuel 1 of the fuel cell stack so as to supply a burner gas generated by the combustion of the combustion fuel 1 into the radiation heat transmitting section 91.

Also, the reforming steam 6 separated in a gas-liquid separator 26 is supplied into the introducing port 41 of the reforming cooling medium layer 14 together with the reforming fuel 8, and water 4 generated from the evaporator 13 is supplied into the gas-liquid separator 26.

The operation of the fuel reforming apparatus according to the first embodiment of the present invention, which is constructed as described above, will now be described. Specifically, the combustion fuel 1 from the fuel cell stack (not shown) is introduced into the burner 10 and burned within the burner space chamber 9 so as to generate heat of a high temperature not lower than 1,000° C. The burner gas imparts heat to the reforming catalyst layer 14, and the burner gas itself is discharged under the state that the temperature of the burner gas is lowered so as to be utilized as a heat source of the evaporator 13. Then, the burner gas is discharged to the outside as burner exhaust gas 3.

In this case, the heat is effectively transmitted to the reformer A by the radiation heat transmission and the convection heat transmission because the center plug 11 is arranged within the burner space chamber 9.

On the other hand, the reforming fuel 8 such as a natural gas is mixed with the steam 6 generated from the gas-liquid separator 26 and, then, circulated into the reforming catalyst layer 14 under the state that the mixed gas has substantially atmospheric pressure. As described previously, the heat of the burner gas is imparted to the reforming catalyst layer 14 and, thus, a reforming reaction is brought about within the reforming catalyst layer 14. In this case, substantially 100% of the fuel 8 is involved in the reforming reaction so as to form hydrogen, carbon monoxide and carbon dioxide. Since the reforming gas containing these formed materials and the unreacted steam has a high temperature, heat is exchanged with the reforming catalyst layer 14 when the reforming gas passes through the regeneration fluid passageway 15, with the result that the waste heat is recovered.

The reforming gas immediately after passing through the regenerating fluid passageway 15 has a high temperature of about 400° C. to 500° C. and, thus, is allowed to pass through the surroundings of the cooling device 16 before entering the first stage carbon monoxide converting catalyst layer 17 so as to be cooled to 200° C. to 300° C. The reforming gas cooled to have a low temperature is allowed to flow into the carbon monoxide converting catalyst layer 17 so as to bring about a so-called "shift reaction" in which the reforming gas reacts with the carbon monoxide and the steam generated in the reforming catalyst layer 14 so as to generate carbon dioxide and hydrogen. Since the shift reaction is an exothermic reaction, the temperature of the reforming gas is elevated while the reforming gas passes through the catalyst layer, and the reaction substantially reaches the state of equilibrium when the reforming gas comes out of the carbon monoxide converting catalyst layer 17.

The reforming gas passing through the first stage carbon monoxide converting catalyst layer 17 is cooled to have a low temperature while passing through the surroundings of the cooling device 18 so as to be put again in the state adapted for the shift reaction. Since the equilibrium concentration of the cooled reforming gas is lowered with a decrease in temperature, the shift reaction proceeds again while the cooled reforming gas passes through the second stage carbon monoxide converting catalyst layer 19, with the result that the carbon monoxide concentration is lowered to about 5,000 ppm in accordance with the temperature elevation. Then, the reforming gas is mixed with traces of the air supplied from the air introducing header 62 through the fine holes 64 and, then, flows into the first stage carbon monoxide selective oxidation catalyst layer 21 through the surroundings of the cooling device 20 under the state that the temperature of the reforming gas is lowered.

While the reforming gas passes through the carbon monoxide selective oxidation catalyst layer 21, the carbon monoxide contained in the reforming gas reacts with the oxygen in the air so as to be converted into carbon dioxide. Since this converting reaction is a reaction generating a large amount of heat, the reforming gas is rapidly heated to a high temperature. Then, the reforming gas is cooled by the cooling device 22 and mixed again with traces of the air supplied from the air introducing header 622. The selective oxidizing reaction proceeds again while the reforming gas mixed with the air flows through the second stage carbon monoxide selective oxidation catalyst layer 23, with the result that the carbon monoxide concentration is lowered to 10 ppm or less in accordance with the temperature elevation. Then, the reforming gas is cooled by the cooling device 24 so as to be supplied into the fuel cell stack (not shown).

According to the first embodiment of the present invention described above, the reforming catalyst layer 14, the regenerating fluid passageway 15, the heat insulating layer 25, the carbon monoxide converting catalyst layers 17, 19 and the carbon monoxide selective oxidation catalyst layers 21, 23 are outwardly arranged in the order mentioned around the burner space chamber 9. What should be noted is the constituting member having a high temperature is arranged in the center, and the other constituting members are arranged such that the temperatures of these constituting members are gradually lowered with increase in the distance of the member from the member having a high temperature, which is arranged in the center. As a result, the difference in temperature between the adjacent constituting members is rendered minimal, compared with the other arrangement of the constituting members of the fuel reforming apparatus. It follows that the heat leakage between the adjacent constituting members is rendered minimal so as to make it possible to ensure the temperature level that permits maximum reaction efficiency in each catalyst layer even if the constituting members are arranged close to each other. Naturally, it is possible to make the fuel reforming apparatus integral and compact.

In the construction described above, the carbon monoxide selective oxidation reactor C (carbon monoxide selective oxidation catalyst layers 21, 23 and the air headers 621, 622), which is the constituting member having the lowest temperature, is arranged in the outermost position so as to make it possible to minimize the heat loss. It follows that it is possible to increase the power generating efficiency of the polymer electrolyte membrane fuel cell.

Further, as shown in FIG. 1, it is possible to arrange the evaporator (steam generator) 13 consisting of, for example, a spirally wound heat transmitting pipe in the space formed by cutting a part of the center plug 11 within the burner space chamber 9. In this case, the evaporator 13 is also included in the integral structure so as to render the entire apparatus more compact.

Further, in the first embodiment of the present invention, a space is formed inside of the center plug 11 within the burner space chamber 9, and the cylindrical partition wall 12 is arranged in the space thus formed, as shown in FIG. 1. In addition, the evaporator 13 is arranged between the outer circumferential surface of the partition wall 12 and the center plug 11, as shown in the drawing. In this case, the reforming performance can be maintained without impairing the heat transmission to the reformer A, with the result that it is possible to make the entire apparatus compact and to improve the power generation efficiency of the polymer electrolyte membrane fuel cell.

Further, in the first embodiment of the present invention, the carbon monoxide converting catalyst layer is divided into the first stage and second stage carbon monoxide converting catalyst layers 17 and 19, and the cooling device 18 is arranged intermediate between these first stage and second stage carbon monoxide converting catalyst layers 17 and 19, as shown in FIG. 1. As a result, it is unnecessary to bury the heat transmitting pipe in the catalyst layer as in the prior art so as to make it possible to decrease the width of the catalyst layer, with the result that it is possible to miniaturize the fuel reforming apparatus of the polymer electrolyte membrane fuel cell. Needless to say, it is possible to divide more finely the catalyst layer into small portions and to arrange cooling devices intermediate between the adjacent divided portions in respect of all the divided portions of the catalyst layer, with substantially the same effect.

Further, in the first embodiment of the present invention, the carbon monoxide selective oxidation catalyst layer is divided into the first stage and second stage carbon monoxide selective oxidation catalyst layers 21 and 23, and the cooling device 22 is arranged intermediate between these first stage and second stage carbon monoxide selective oxidation catalyst layers 21 and 23, as shown in FIG. 1. In this case, the region locally heated to a high temperature within the catalyst layer is decreased, compared with the prior art in which the cooling is performed by burying a heat transmitting pipe within the catalyst layer, with the result that it is possible to use the minimum required amount of catalyst so as to make it possible to render compact the entire apparatus. Needless to say, it is possible to divide more finely the catalyst layer into small portions and to arrange cooling devices intermediate between the adjacent divided portions in respect of all the divided portions of the catalyst layer so as to further decrease the region heated to a high temperature.

Further, in the first embodiment of the present invention, the cooling device 24 is arranged downstream of the carbon monoxide selective oxidation catalyst layer 23, as shown in FIG. 1. In this case, it is possible to decrease the region heated to a high temperature within the catalyst layer, compared with the prior art in which the cooling is performed by burying a heat transmitting pipe in the catalyst layer. It follows that it suffices to use the catalyst in the minimum amount required so as to make it possible to render the entire apparatus compact.

Further, in the first embodiment of the present invention, the clearance (heat insulating layer) 25 is formed between the reformer A and the carbon monoxide converter B, as shown in FIG. 1, as shown in FIG. 1. Therefore, even if the carbon monoxide converter B or the carbon monoxide selective oxidation reactor C each having the operating temperature of about 100° C. to 300° C. is arranged adjacent to the reformer portion having a high operating temperature of generally 500° C. to 1,000° C., the transformer B or the reactor C can be thermally separated from the reformer portion A. It follows that the load of the cooling devices 16, 18, 20, 22 and 24 is not increased by the leakage of heat so as to make it possible to miniaturize the cooling device. In addition, it is possible to absorb the difference in elongation caused by the thermal expansion of the partition wall taking place in the reformer having a high temperature level and in the carbon monoxide converter B having a low temperature level so as to suppress the thermal stress. As a result, it is possible to solve the problem in terms of the construction and the mechanical strength. It follows that the fuel reforming apparatus can be miniaturized.

Further, in the first embodiment of the present invention, it is possible to permit a mixture of the reforming fuel 8 and the reforming steam 6 into the cooling device 16 arranged upstream of the first stage carbon monoxide converting catalyst layer 17, as shown in the drawing. The particular construction permits cooling the reforming gas and also permits heat recovery, with the result that it is possible to improve the system efficiency of the fuel cell system.

Further, in the first embodiment of the present invention, it is possible to permit a gas-liquid mixture coming from, for example, the evaporator 13 to flow into the cooling device 18 arranged intermediate between the adjacent carbon monoxide converting catalyst layers, as shown in FIG. 1. The particular construction permits cooling the reforming gas and also permits the heat recovery. It follows that it is possible to improve the system efficiency of the fuel cell system.

Still further, in the first embodiment of the present invention, it is possible to form the cooling devices 20, 22 and 24 for the carbon monoxide selective oxidation catalyst layer by using a single heat transmitting pipe and to use a part of the cooling water of the battery body within the heat transmitting pipe, as shown in FIG. 1. The particular construction permits recovering heat simultaneously with the cooling without preparing a new cooling medium so as to improve the power generating efficiency of the fuel cell system.

Figure 2:
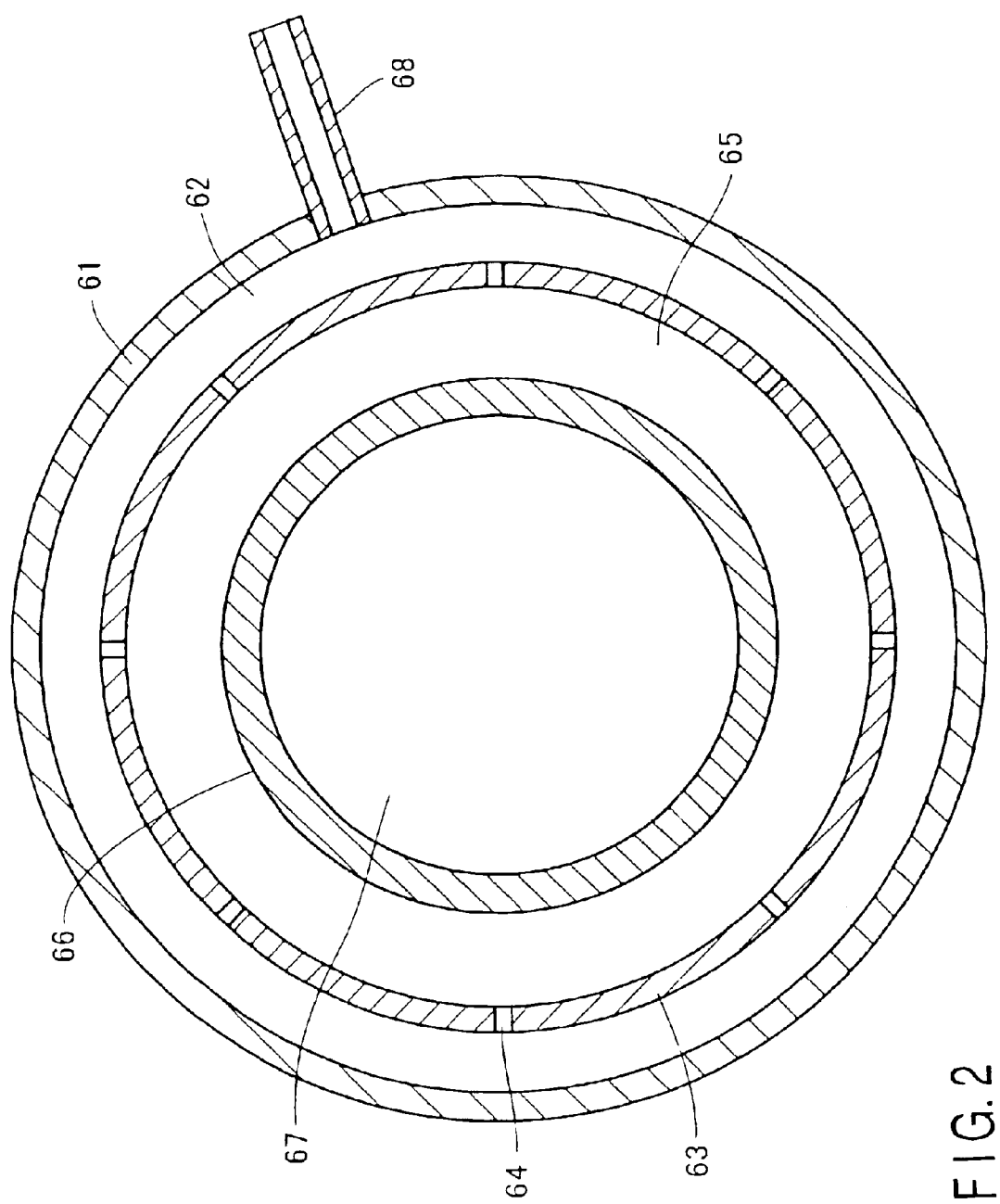
FIG. 2 is a horizontal cross-sectional view schematically showing only the air introducing header portion of the fuel reforming apparatus for a polymer electrolyte membrane fuel cell according to the first embodiment of the present invention.

FIG. 2 schematically shows a horizontal cross section the header portion 62 alone for introducing the air into the carbon monoxide selective oxidation reactor C included in the fuel reforming apparatus for the polymer electrolyte membrane fuel cell shown in FIG. 1. The portion inside the fluid passageway included in the second stage carbon monoxide converting catalyst layer 19 is omitted from the drawing of FIG. 2. The air 2 is introduced through a single point into an air introducing header 62 by an air introducing pipe 68. Further, at least 8 fine holes 64 are formed in an air header inner wall (partition wall) 63 positioned between the air header 62 and an annular fluid passageway 65 including the carbon monoxide selective oxidizing catalyst layer.

The air introduced from the air introducing pipe 68 fixed to and extending through a part of an air header outside wall 61 into the air introducing header 62 flows from the air header 62 into the annular fluid passageway 65 through the fine holes 64 so as to be mixed with the reforming gas passing through the second stage carbon monoxide converting catalyst layer. After being mixed with the reforming gas, the air is diffused within the reforming gas and flows through the outer circumference of the cooling device 20 shown in FIG. 1 into the first stage carbon monoxide selective oxidizing catalyst layer 21.

It should be noted that, if the number of fine holes 64 is small, the diffusion of the air within the reforming gas does not proceed, resulting in a nonuniform air distribution. As a result, the reaction produced by the carbon monoxide selective oxidizing catalyst is not carried out uniformly within the catalyst layer. It follows that it is possible for the carbon monoxide concentration as a whole not to be lowered to a prescribed level or less.

Under the circumstances, it is necessary to diffuse the air sufficiently into the reforming gas. For sufficient diffusion of the air, it is conceivable to increase the distance between the air introducing pipe 68 and the carbon monoxide selective oxidizing catalyst. However, this method causes the apparatus to be rendered bulky.

However, in the construction according to the first embodiment of the present invention, the air can be diffused sufficiently within the reforming gas even if the diffusing distance is short. FIGS. 3A to 3D are graphs each showing an example of the analytical result effective for presenting the reason for permitting a sufficient air diffusion within the reforming gas. To be more specific, FIGS. 3A to 3D show the results of calculation on the diffusion behavior of the oxygen within the air, which was performed by changing the number of fine holes 64 in respect of in the first embodiment of the present invention shown in FIG. 1. In the graph of each of FIGS. 3A to 3D, the angle denoting the position within the annular fluid passageway is plotted on the abscissa, and the oxygen concentration in the inlet port of the carbon monoxide selective oxidizing catalyst layer 22 is plotted on the ordinate. FIG. 3A covers the case where a single fine hole 64 was formed in the air header inner wall 63, FIG. 3B covers the case where two fine holes 64 were formed in the air header inner wall 63, FIG. 3C covers the case where four fine holes 64 were formed in the air header inner wall 63, and FIG. 3D covers the case where eight fine holes 64 were formed in the air header inner wall 63. As apparent from FIG. 3D, it is possible to permit the oxygen to be diffused substantially uniformly if eight fine holes 64 are formed in the air header inner wall 63.

What should be noted is that the construction according to the first embodiment of the present invention permits the air to be diffused uniformly within the reforming gas even if the mixing distance of the air and the reforming gas is short. It follows that it is possible to make compact the fuel reforming apparatus for a polymer electrolyte membrane fuel cell.

The description given above covers the case where the air is introduced into the first stage carbon monoxide selective oxidizing catalyst layer 21. However, exactly the same effect can be produced in the case where the air is introduced into the second stage carbon monoxide selective oxidizing catalyst layer 23.

FIG. 4 is a vertical cross-sectional view schematically showing the construction of a fuel reforming apparatus for a polymer electrolyte membrane fuel cell according to a second embodiment of the present invention. As shown in the drawing, the fuel reforming apparatus according to the second embodiment of the present invention comprises a cylindrical cooling device 16 for cooling the inlet gas of the carbon monoxide converter, said cooling device 16 being arranged concentrically with the reformer and positioned close to the outer circumferential surface of the cylindrical body 9a having an arcuate surface and included in the reformer, a cylindrical intermediate cooling device 18 for cooling the carbon monoxide selective oxidizing catalyst layer and arranged in substantially the center of the outer circumferential surface of the cooling device 16, and first stage and second stage cylindrical carbon monoxide converting catalyst layers 17 and 19 arranged in upper and lower positions, respectively, of the outer circumferential surface excluding the central position of the cooling device 16.

Also, a cooling device in front of the carbon monoxide selective oxidizing catalyst layer, a first stage carbon monoxide selective oxidizing catalyst layer 21, an intermediate cooling device 22 for the carbon monoxide selective oxidizing catalyst layer, and a cooling device 24 downstream of the carbon monoxide selective oxidizing catalyst layer are successively arranged close to the carbon monoxide converting catalyst layer 19.

In the construction shown in FIG. 4, the reforming fuel 8 and the reforming steam 6 are supplied into the reforming catalyst layer 14 constructed in the shape of a concentric cylinder so as to bring about a reforming reaction for forming a reforming gas rich in hydrogen from hydrocarbon. Where, for example, methane is used as the fuel to be reformed, the reforming reaction proceeds as follows:

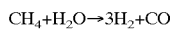

$$CH_4 + H_2O \rightarrow 3H_2 + CO$$

The reforming reaction is an endothermic reaction. Therefore, it is necessary to supply heat in order to permit the reaction to proceed and to maintain the reaction temperature. Such being the situation, the burner space chamber 9 is arranged inside the reforming catalyst layer.

The fuel 1 for combustion is supplied to the burner 10 together with the air 2 so as to be burned within the burner space chamber 9, thereby generating a burner gas of high temperature. It is possible to use a combustible gas that was not consumed in the reaction carried out within the fuel cell as the fuel 1 for combustion in addition to material equal in composition to the fuel to be reformed.

While passing through the radiation heat transmitting section 91 and the convection heat transmission section 92, the burner gas exchanges heat with the reforming catalyst layer 14 through the partition wall so as to replenish the heat required for the reforming reaction.

The burner gas passing through the convection heat transmission section 92 maintains a high temperature of several hundred degrees centigrade. Therefore, it is possible to arrange the evaporator 13 below the radiation heat transmission section 91 and inside the convection heat transmission section 92 so as to recover heat.

Regarding an example of the flow of the burner gas in the construction shown in FIG. 4, the burner gas flowing downward within the convection heat transmission section 92 is inverted to flow upward so as to exchange heat with water or a water-steam mixture within the evaporator 13. After the heat exchange, the flow of the burner gas is further inverted to flow downward so as to flow to the outside of the composite reactor.

In the case of assuming the particular construction exemplified above, it is desirable to arrange the center plug 11 in the radiation heat transmission section 91 and between the convection heat transmission section 92 and the evaporator 13 so as to stop the heat dissipation from the burner gas that is exchanging heat with the reforming catalyst layer. It is also desirable to arrange the partition wall 12 so as to dissipate the heat from the hot burner gas before the heat exchange in the evaporator 13 to the cooled burner gas after the heat exchange.

On the other hand, the reforming gas passing through the reforming catalyst layer 14 flows into the regenerating fluid passageway 15. When it comes to the drawing of FIG. 4, the reforming gas flowing upward from the lower region to the upper region within the reforming catalyst layer 14 is inverted to enter again the regenerating fluid passageway 15 so as to flow downward. In the construction exemplified in FIG. 4, the combustion reaction takes place in the upper region, and thus the temperature in the outlet port of the reforming catalyst layer 14 is higher than the temperature in the inlet port and the intermediate portion of the reforming catalyst layer 14.

As a result, it is possible to recover the heat in the reforming catalyst layer by allowing the high temperature gas coming from the outlet port of the reforming catalyst layer to flow through the regenerating fluid passageway 15 positioned adjacent to the reforming catalyst layer 14. The flow of the reforming gas after the heat recovery is inverted upward as exemplified in FIG. 4 so as to perform the heat exchange in the cooling device 16 for cooling the inlet gas of the carbon monoxide converting catalyst layer. It is possible to use the reforming fuel 8 and the reforming steam 6 before introduction into the reforming catalyst layer 14 as the cooling medium of the cooling device 16 for cooling the inlet gas of the carbon monoxide converting catalyst layer. It is possible to improve the thermal efficiency by using the cooling device 16 for cooling the inlet gas of the carbon monoxide converting catalyst layer as a preheater of the reforming fuel 8.

Among the devices referred to above, it is desirable in terms of the heat exchange function to arrange the burner space chamber 9 inside the reforming catalyst layer 14 and to arrange the regenerating fluid passageway 15 on the outside of the reforming catalyst layer 14. In addition, it is desirable for the burner space chamber 9 to be cylindrical because the heat conductivity can be made uniform in the case where the distance between the flame within the burner space chamber 9 and wall surface of the chamber 9 is uniform. In this sense, it is desirable for the reforming catalyst layer 14 and the regenerating passageway 15 to be formed annular and to be arranged around the burner space chamber 9 in a manner to form an integral structure. Also, it is desirable for the cooling device 16 for cooling the inlet gas of the carbon monoxide converting catalyst layer to be arranged as close to the reforming catalyst layer 14 as possible in the case where the cooling device 16 is used as a preheater of the reforming fuel 8. Therefore, it is desirable for the cooling device 16 to be formed annular and arrange on the outside of the regenerating passageway 15, as shown in FIG. 4. It should be noted, however, that the reforming gas passing through the regenerating fluid passageway 15 has a temperature higher than that of the cooling device 16 for cooling the inlet gas of the carbon monoxide converting catalyst layer 14. Therefore, if the regenerating passageway 15 is positioned close to the cooling device 16, heat of a high degree, which is to be recovered in the reforming catalyst layer 14, tends to be transmitted to the cooling device 16 for cooling the inlet gas of the carbon monoxide converting catalyst layer so as to lower the thermal efficiency. Under the circumstances, it is necessary to arrange the heat insulating layer 25 between the regenerating fluid passageway 15 and the cooling device 16 for the heat insulation purpose.

The reforming gas cooled by the cooling device 16 for cooling the inlet gas of the carbon monoxide converting catalyst layer flows into the first stage carbon monoxide converting catalyst layer 17, with the result that the carbon monoxide concentration is lowered from about 10% to several percent by the carbon monoxide converting reaction given below:

$$CO + H_2 \rightarrow CO_2 + H_2$$

The reaction rate of the carbon monoxide converting reaction given above is increased with elevation of the temperature, and the reaction can be brought about with a small amount of the catalyst. However, since the carbon monoxide converting reaction is an exothermic equilibrium reaction, there is a lower limit in the CO concentration, and the lower limit of the CO concentration is shifted upward with elevation of the temperature. Since $H_2$ is generated by the carbon monoxide converting reaction, it is desirable for the CO concentration to be low for improving the efficiency. However, it is impossible to lower sufficiently the CO concentration by using only the first stage carbon monoxide converting catalyst layer 17 having a high temperature.

Under the circumstances, the intermediate cooling device 18 for the carbon monoxide converting catalyst layer is further arranged downstream of the carbon monoxide converting catalyst layer 17 so as to permit the CO concentration to be lowered to several thousands ppm level in the second stage carbon monoxide converting catalyst layer 19. Although the reaction rate is low because the temperature is low, the reaction amount is small because the CO concentration is lowered to about several percent in the stage and, thus, it is possible to finish the reaction with a catalyst amount markedly smaller than that in the case where the carbon monoxide converting reaction is brought about by the temperature condition alone in the second stage.

In order render the apparatus compact, it is advisable to form the first stage carbon monoxide converting catalyst layer 17, the intermediate cooling device 18 for cooling the carbon monoxide converting catalyst layer, and the second stage carbon monoxide converting catalyst layer 19 in an annular form further on the outer circumferential surface of the cooling device 16 for cooling the inlet gas of the carbon monoxide converting catalyst layer formed in an annular form.

Although, the CO concentration in the outlet port of the second stage carbon monoxide converting layer 19 is on the level of several thousand ppm, it is necessary to lower further the CO concentration to several to scores of ppm in order to supply the processed reforming gas to a polymer electrolyte membrane fuel cell that is operated at a low temperature. As a means for achieving the particular object, a method is known in which traces of oxygen or air are mixed with the reforming gas and, then, the reforming gas is passed through a carbon monoxide selective oxidizing catalyst layer so as to oxidize CO as given below:

$$CO + \tfrac{1}{2}O_2 \rightarrow CO_2$$

However, a water generating side reaction given below is brought about with elevation in the temperature of the catalyst layer so as to consume $H_2$ that is to be used in the fuel cell, and thus the method referred to above is disadvantageous in efficiency:

$$H_2 + \tfrac{1}{2}O_2 \rightarrow H_2O$$

It follows that it is necessary for the reforming gas mixed with oxygen or air to be introduced into the carbon monoxide selective oxidizing catalyst layer under an appropriately cooled state.

In the example shown in FIG. 4, the reforming gas having a temperature not lower than 200° C. at the outlet port of the second stage carbon monoxide converting catalyst layer 19 is cooled to an appropriate temperature in the cooling device 20 for cooling the inlet port of the carbon monoxide selective oxidizing catalyst layer. It is possible to mix oxygen or air with the reforming gas on either the inlet side or outlet side of the cooling device 20 for cooling the inlet port of the carbon monoxide selective oxidizing catalyst layer. However, it is desirable for oxygen or air to be mixed with the reforming gas on the inlet side because the mixing effect is expected to be improved within the cooling device 20 for cooling the inlet port of the carbon monoxide selective oxidizing catalyst layer. The CO concentration in the reforming gas cooled to an appropriate temperature is lowered to several to several hundred ppm level by the oxidizing reaction with $O_2$ in the first stage carbon monoxide selective oxidizing catalyst layer 21. Then, the reforming gas is cooled again to an appropriate temperature of 100 to 150° C. in the intermediate cooling device 22 for cooling the carbon monoxide selective oxidizing catalyst layer. After the cooling in the intermediate cooling device 22, the reforming gas is allowed to enter into the second stage carbon monoxide selective oxidizing catalyst layer 23 together with oxygen or air, and the CO concentration is lowered to several to scores of ppm level by the oxidizing reaction with $O_2$. It is possible to mix oxygen or air with the reforming gas either on the inlet side or outlet side of the intermediate cooling device 23 for cooling the carbon monoxide selective oxidizing catalyst layer. However, it is desirable for oxygen or air to be mixed with the reforming gas on the inlet side because a stirring effect is expected to be produced within the intermediate cooling device 23 for cooling the carbon monoxide selective oxidizing catalyst layer. Since the gas after the selective oxidizing reaction is heated to a high temperature of 100 to 250° C. because of the oxidizing reaction, the gas after the selective oxidizing reaction is cooled to about 50 to 90° C., which is close to the operating temperature of a polymer electrolyte membrane fuel cell, in the cooling device 24 mounted on the outlet port of the carbon monoxide selective oxidizing catalyst layer so as to prevent the collapse of the temperature balance in the polymer electrolyte membrane fuel cell.

Figure 5:
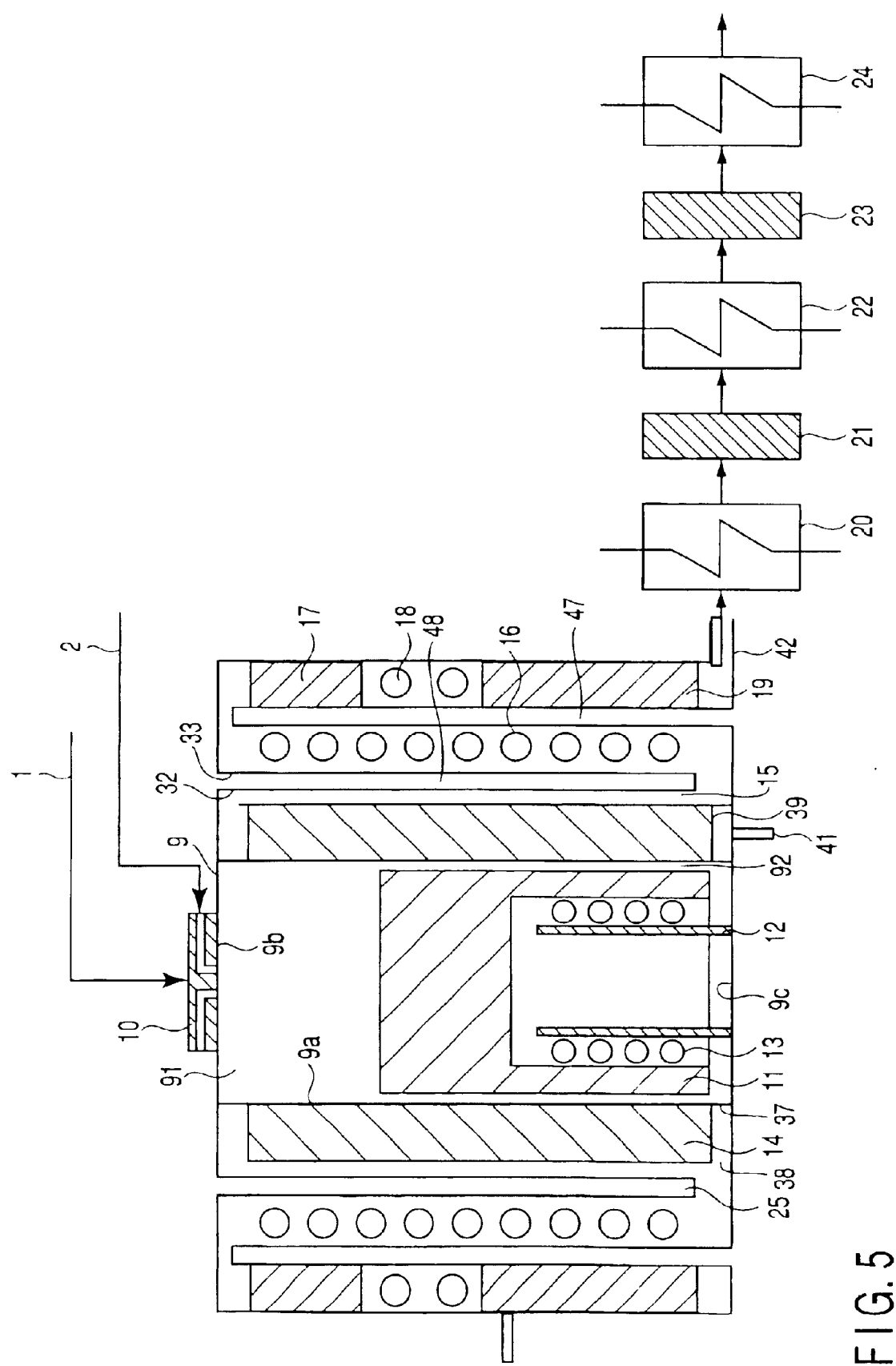
FIG. 5 is a vertical cross-sectional view showing the fuel reforming apparatus for a polymer electrolyte membrane fuel cell according to a third embodiment of the present invention.

FIG. 5 is a vertical cross-sectional view schematically showing the construction of a fuel reforming apparatus for a polymer electrolyte membrane fuel cell according to a third embodiment of the present invention. The third embodiment differs from the second embodiment shown in FIG. 4 in that a heat insulating layer 47 consisting of a clearance is formed on the outside of the cooling device 16 for cooling the inlet gas of the carbon monoxide converting catalyst layer and on the inside of each of the first stage carbon monoxide converting catalyst layer 17, the intermediate cooling device 18 for the carbon monoxide converting catalyst layer, and the first stage carbon monoxide converting catalyst layer 19 so as to prevent the leakage of heat from the inside having a high temperature to the outside having a low temperature.

Particularly, the inlet port portion having the highest temperature in the cooling device 16 for cooling the inlet gas of the carbon monoxide converting catalyst layer is positioned adjacent to the outlet port of the second stage carbon monoxide converting catalyst layer 19. Therefore, if the heat insulating layer 47 is not arranged, the heat that is to be recovered in the cooling device 16 for cooling the inlet gas of the carbon monoxide converting catalyst layer is transmitted to the gas at the outlet pot of the second stage carbon monoxide converting catalyst layer 19 so as to be released to the outside from the composite reforming apparatus and, thus, to lower the thermal efficiency. Naturally, the heat insulating layer formed in the particular portion contributes to the improvement of the thermal efficiency.

Figure 6:
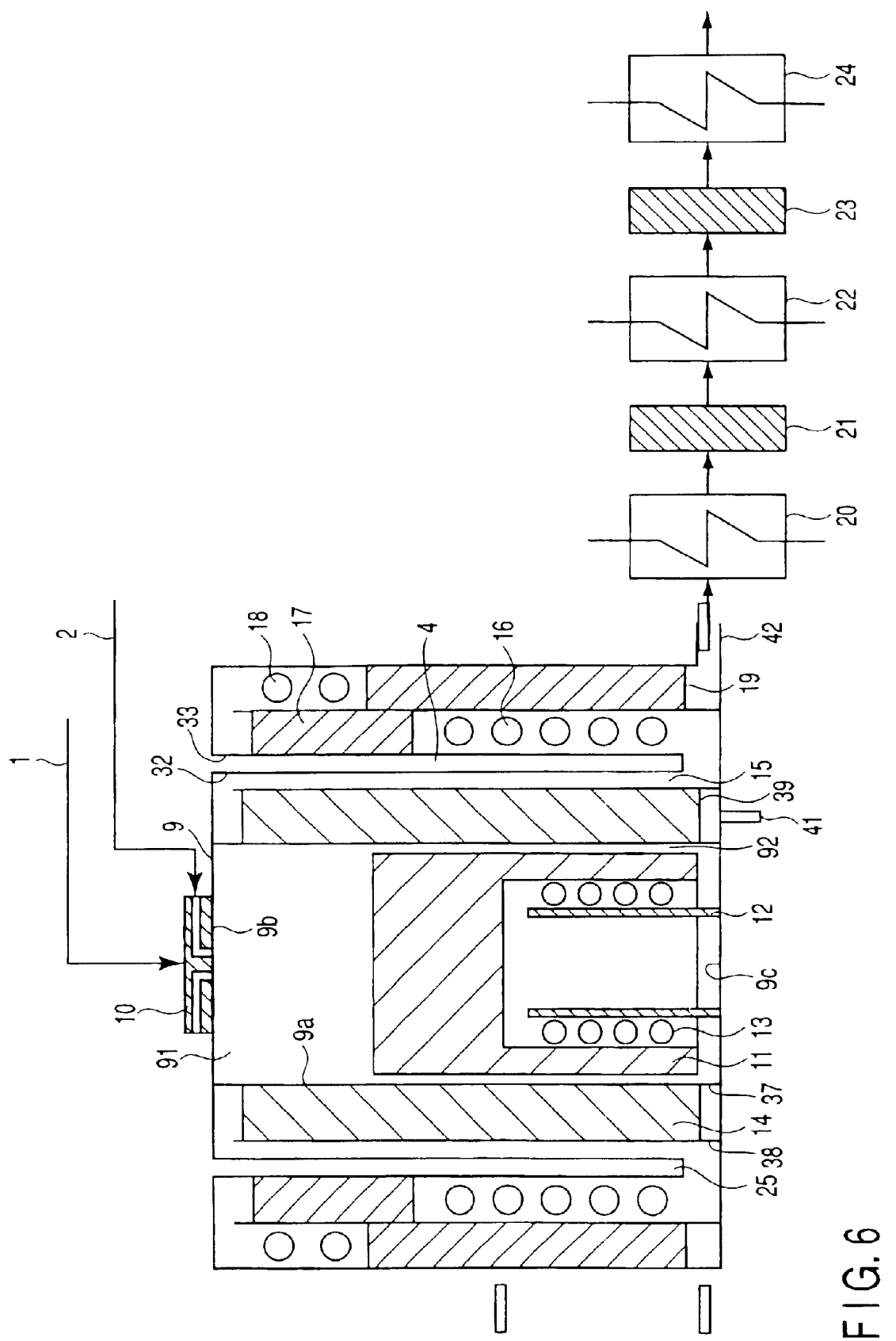
FIG. 6 is a vertical cross-sectional view showing the fuel reforming apparatus for a polymer electrolyte membrane fuel cell according to a fourth embodiment of the present invention.

FIG. 6 is a vertical cross-sectional view schematically showing the construction of a fuel reforming apparatus for a polymer electrolyte membrane fuel cell according to a fourth embodiment of the present invention. The fourth embodiment differs from the second embodiment shown in FIG. 4 in that the first stage carbon monoxide converting catalyst layer 17 is arranged in an annular portion like the cooling device 16 for cooling the inlet gas of the carbon monoxide converting catalyst layer. The particular construction permits increasing the amount of the second stage carbon monoxide converting catalyst layer 19. The second stage carbon monoxide converting catalyst layer is operated at a low temperature because the CO concentration is lowered. However, the amount of the catalyst used is larger than that in the first stage because the reaction rate is reduced at a low temperature. It should be noted that the construction shown in FIG. 6 permits increasing the amount of the second stage carbon monoxide converting catalyst layer so as to achieve the CO concentration of a lower level.

Figure 7:
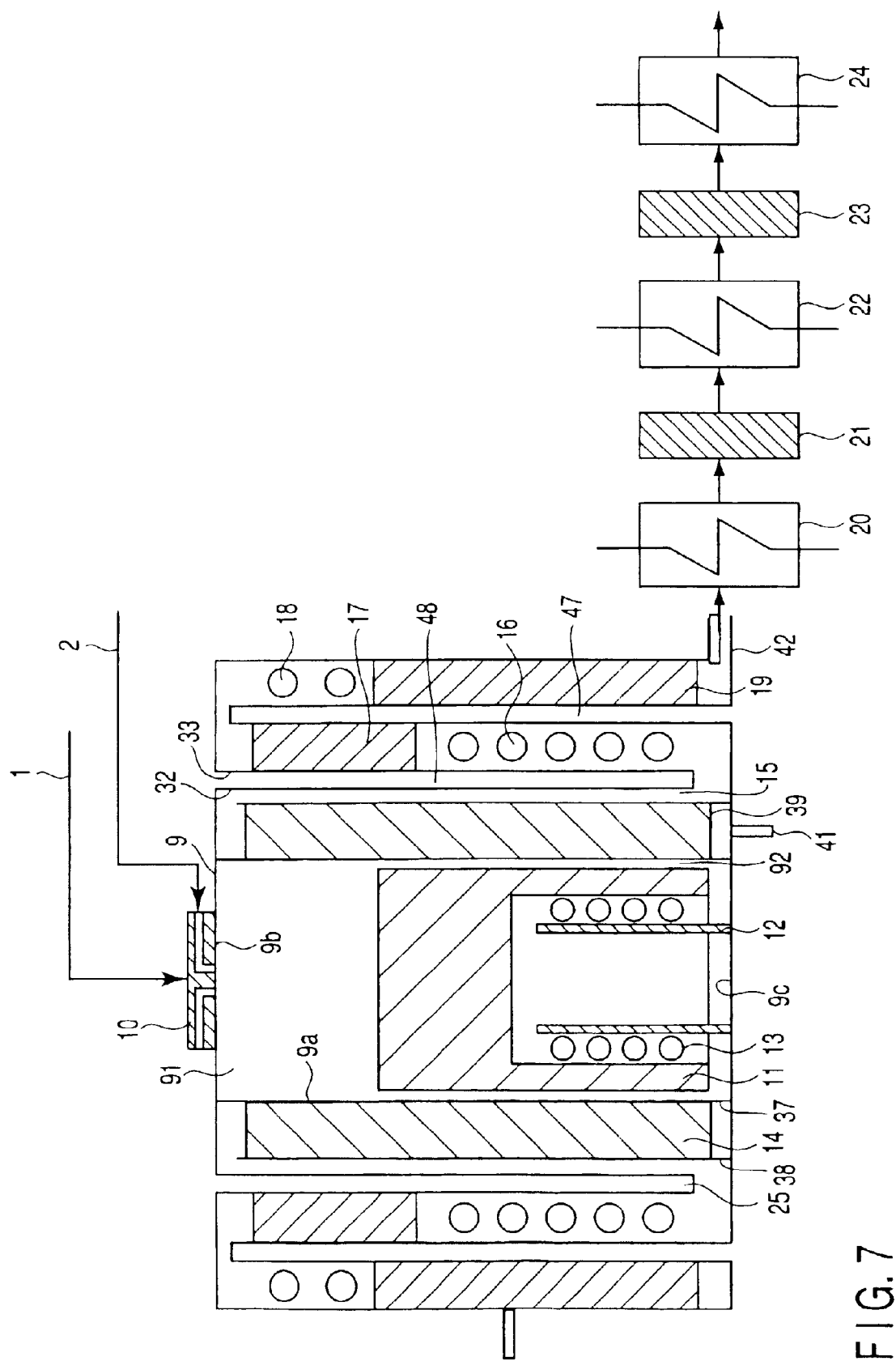
FIG. 7 is a vertical cross-sectional view showing the fuel reforming apparatus for a polymer electrolyte membrane fuel cell according to a fifth embodiment of the present invention.

FIG. 7 is a vertical cross-sectional view schematically showing the construction of a fuel reforming apparatus for a polymer electrolyte membrane fuel cell according to a fifth embodiment of the present invention. The fifth embodiment differs from the fourth embodiment shown in FIG. 6 in that a heat insulating layer is arranged on the outside of each of the cooling device 16 for cooling the inlet gas of the carbon monoxide converting catalyst layer and the first stage carbon monoxide converting catalyst layer 17 and on the inside of each of the intermediate cooling device 18 for the carbon monoxide converting catalyst layer and the first stage carbon monoxide converting catalyst layer 19 so as to prevent the leakage of heat from the inside having a high temperature to the outside having a low temperature. The merit produced by the particular arrangement is equal to that described previously in conjunction with the fourth embodiment.

Figure 8:
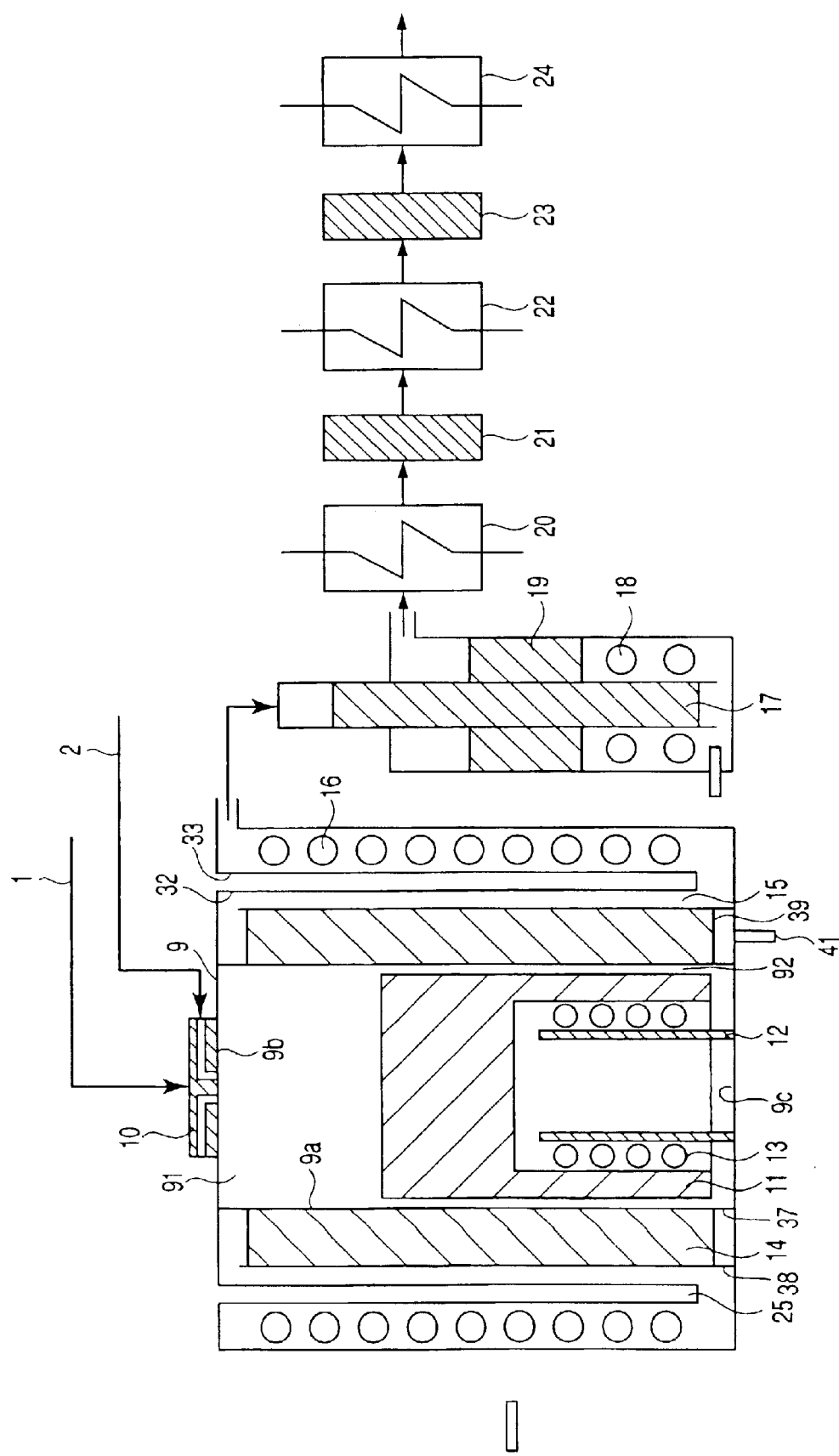
FIG. 8 is a vertical cross-sectional view showing the fuel reforming apparatus for a polymer electrolyte membrane fuel cell according to a sixth embodiment of the present invention.

FIG. 8 is a vertical cross-sectional view schematically showing the construction of a fuel reforming apparatus for a polymer electrolyte membrane fuel cell according to a sixth embodiment of the present invention. In the sixth embodiment shown in FIG. 8, the carbon monoxide converting catalyst layer 17, the intermediate cooling device 18 for the carbon monoxide converting catalyst layer, and the second stage carbon monoxide converting catalyst layer 19 are arranged around the structure prepared by concentrically arranging the cooling device 16 for cooling the inlet gas of the carbon monoxide converting catalyst layer in the proximity of the outer circumferential surface of the reformer. Specifically, the cylindrical intermediate cooling device 18 for the carbon monoxide converting catalyst layer and the cylindrical carbon monoxide converter 19 housing the cylindrical second stage carbon monoxide converting catalyst layer are concentrically arranged side by side in the axial direction on the outer circumferential surface of the first stage carbon monoxide converting catalyst layer 17 having a columnar outer form.

The particular construction produces a prominent function and effect as described below. Specifically, the reforming gas cooled in the cooling device 16 for cooling the inlet gas of the carbon monoxide converting catalyst layer flows into the cylindrical first stage carbon monoxide converting catalyst layer 17 so as to lower the CO concentration, which is about 10%, to about several percent. Then, the reforming gas flows into the intermediate cooling device 18 for the carbon monoxide converting catalyst layer, said intermediate cooling device 18 being constructed in an annular form on the outside of the transforming catalyst layer 17, so as to be cooled. Further, the CO concentration in the reforming gas is further lowered to about several thousand ppm in the second stage carbon monoxide converting catalyst layer 19 and, then, the reforming gas is allowed to flow into the cooling device 20 for cooling the inlet port of the carbon monoxide selective oxidizing catalyst layer. The functions and effects produced by the apparatuses arranged downstream of the cooling device 20 for cooling the inlet port of the carbon monoxide selective oxidizing catalyst layer are equal to those described previously in conjunction with the embodiment shown in FIG. 4.

In each of the embodiments shown in FIGS. 4 to 7, the constituting members of the fuel reforming apparatus are concentrically arranged so as to increase the diameter of the resultant fuel reforming apparatus. Particularly, the occupied volume tends to be increased in the construction shown in FIGS. 5 and 7. In this case, the occupied volume can be rather decreased by constituting the apparatuses ranging between the first stage carbon monoxide converting catalyst layer 17 and the second stage carbon monoxide converting catalyst layer 19 by using separate apparatuses.

In addition, the length of the catalyst layer is generally required to be at least three times as much as the typical diameter in designing the catalyst layer. In the embodiment shown in each of FIGS. 4 to 7, however, the catalyst layer positioned on the outer circumference, particularly, the second stage carbon monoxide converting catalyst layer 19, has a large cross-sectional area, though the width is small, with the result that it is difficult in some cases to keep the required length of the catalyst layer.

It is possible to keep the ratio of the length of the catalyst layer to the typical diameter at a prescribed value or more by employing the construction shown in FIG. 8. Also, the temperature control can be achieved more simply because the heat does not migrate from the regenerating fluid passageway 15 having a high temperature.

Figure 9:
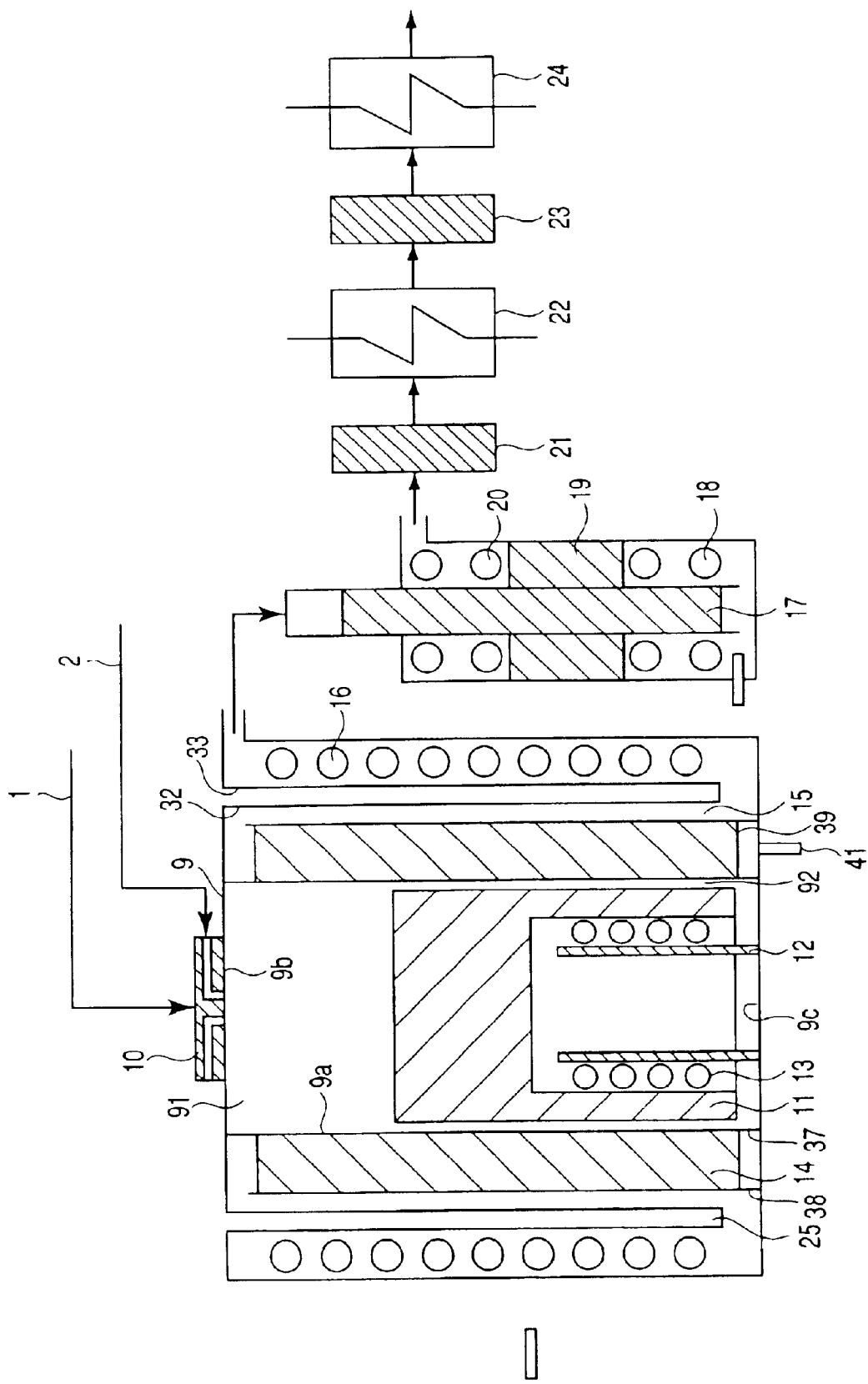
FIG. 9 is a vertical cross-sectional view showing the fuel reforming apparatus for a polymer electrolyte membrane fuel cell according to a seventh embodiment of the present invention.

FIG. 9 is a vertical cross-sectional view schematically showing the construction of a fuel reforming apparatus for a polymer electrolyte membrane fuel cell according to a seventh embodiment of the present invention. In this embodiment, the cooling device 20 for cooling the inlet port of the carbon monoxide selective oxidizing catalyst layer is further made integral with the carbon monoxide converting catalyst layer 17, compared with the embodiment shown in FIG. 8.

The particular construction permits decreasing the volume occupies by the apparatus and also permits decreasing the heat dissipation from the pipes before and after the cooling device 20 for cooling the inlet port of the carbon monoxide selective oxidizing catalyst layer.

Figure 10:
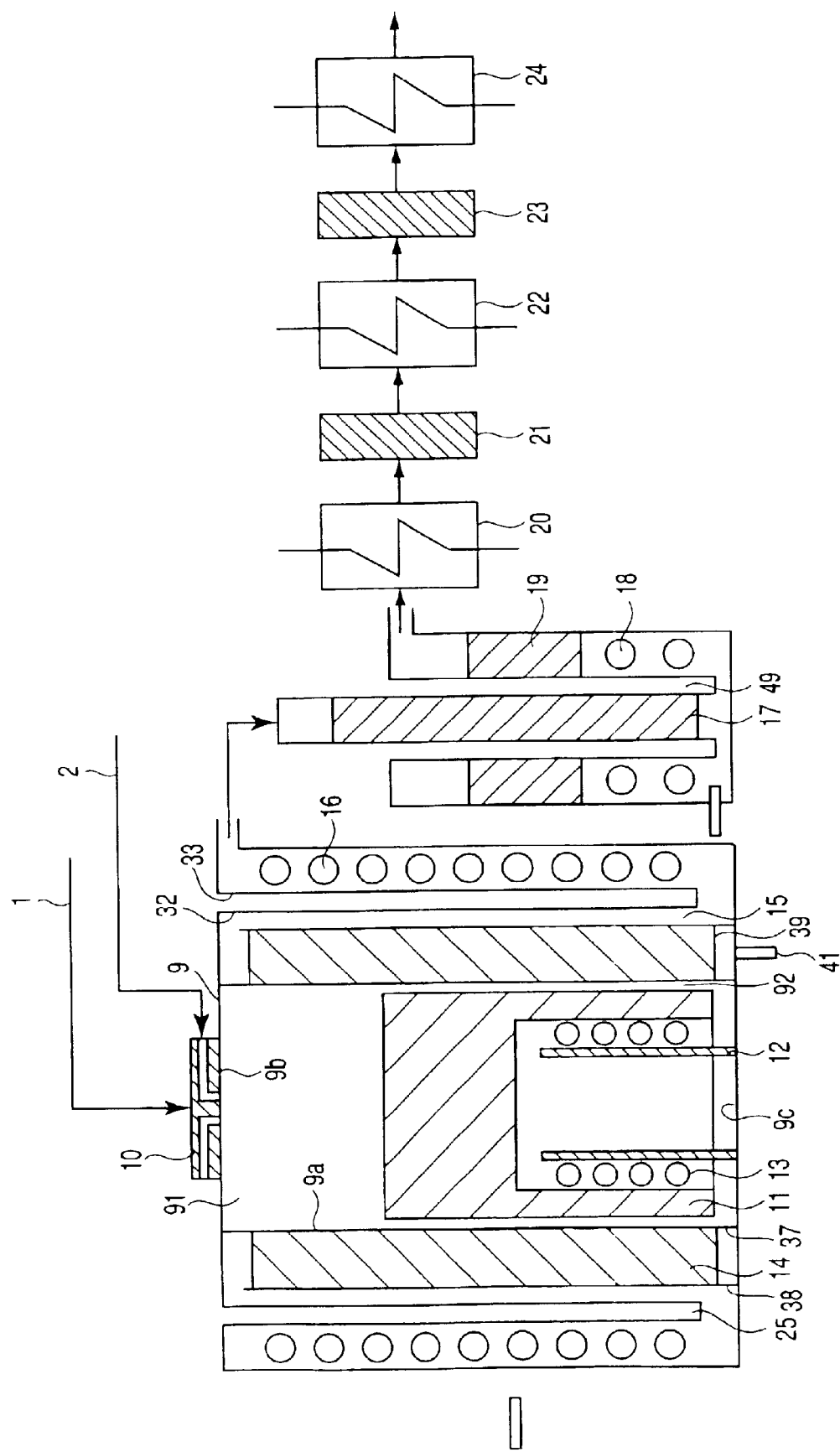
FIG. 10 is a vertical cross-sectional view showing the fuel reforming apparatus for a polymer electrolyte membrane fuel cell according to an eighth embodiment of the present invention.

FIG. 10 is a vertical cross-sectional view schematically showing the construction of a fuel reforming apparatus for a polymer electrolyte membrane fuel cell according to an eighth embodiment of the present invention. The eighth embodiment differs from the embodiment shown in FIG. 8 in that a heat insulating layer 49 consisting of a clearance is formed between the cylindrical first stage carbon monoxide converting catalyst layer 17 and each of the intermediate cooling device 18 for the carbon monoxide converting catalyst layer and the second stage carbon monoxide converting catalyst layer 19 formed annular to surround the outer surface of cylindrical first stage carbon monoxide converting catalyst layer 17.

The heat insulating layer 49 permits shielding the heat transmission from the first stage carbon monoxide converting catalyst layer 17 positioned in the center to the intermediate cooling device 18 for the carbon monoxide converting catalyst layer and the second stage carbon monoxide converting catalyst layer 19 positioned on the outside. The heat insulating layer 49 permits maintaining the first stage carbon monoxide converting catalyst layer 17 at a desired high temperature and also permits maintaining the second stage carbon monoxide converting catalyst layer 19 at a desired low temperature.

Figure 11:
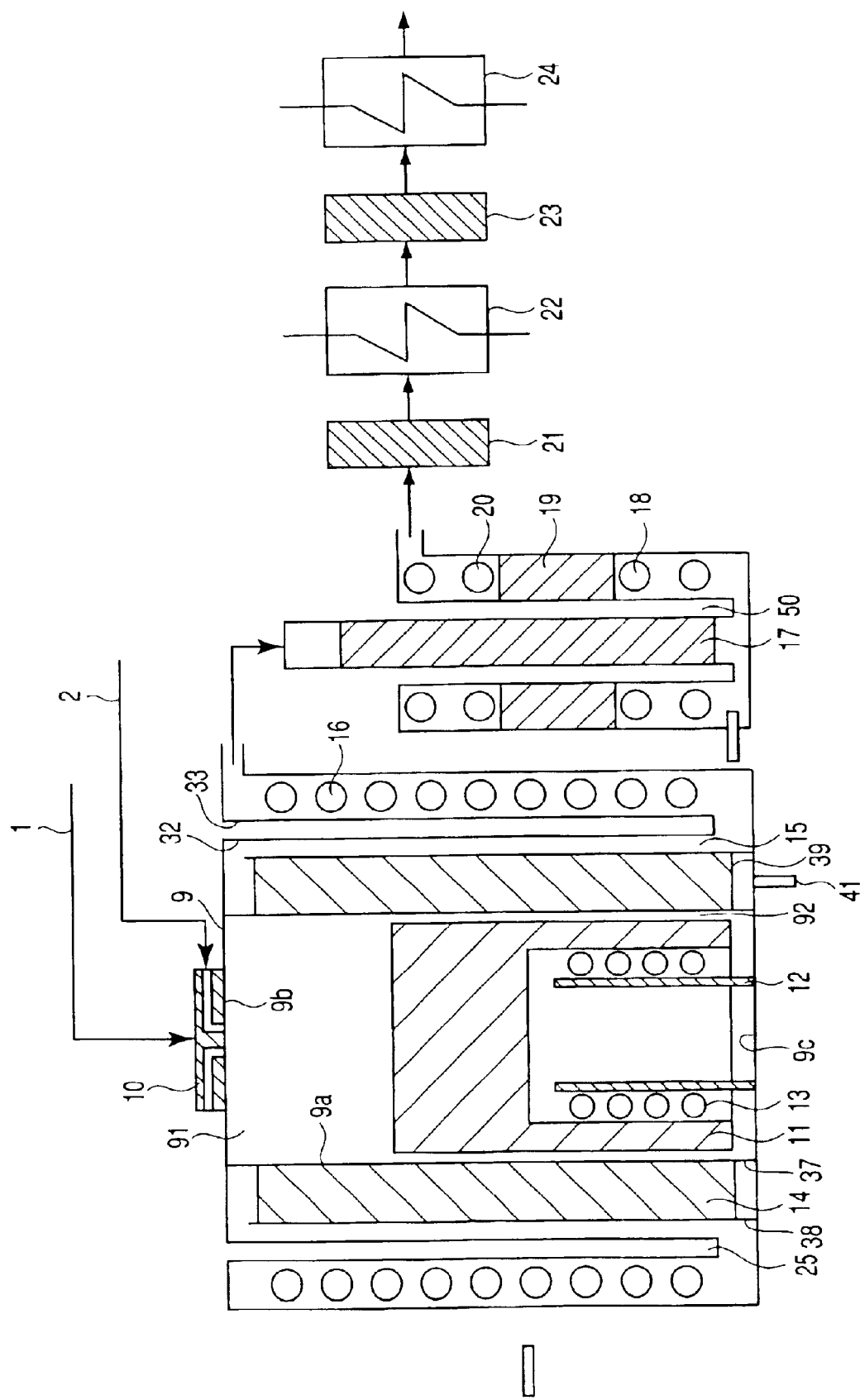
FIG. 11 is a vertical cross-sectional view showing the fuel reforming apparatus for a polymer electrolyte membrane fuel cell according to a ninth embodiment of the present invention.

FIG. 11 is a vertical cross-sectional view schematically showing the construction of a fuel reforming apparatus for a polymer electrolyte membrane fuel cell according to a ninth embodiment of the present invention. In the ninth embodiment shown in FIG. 11, a heat insulating layer 50 consisting of a clearance is formed between the cylindrical first stage carbon monoxide converting catalyst layer 17 and each of the intermediate cooling device 18 for the carbon monoxide converting catalyst layer and the second stage carbon monoxide converting catalyst 19 formed annular in a manner to surround the outer circumferential surface of the cylindrical first stage carbon monoxide converting catalyst layer 17. The effect produced by the heat insulating layer 50 is equal to that described previously in conjunction with the embodiment shown in FIG. 10.

Figure 12:
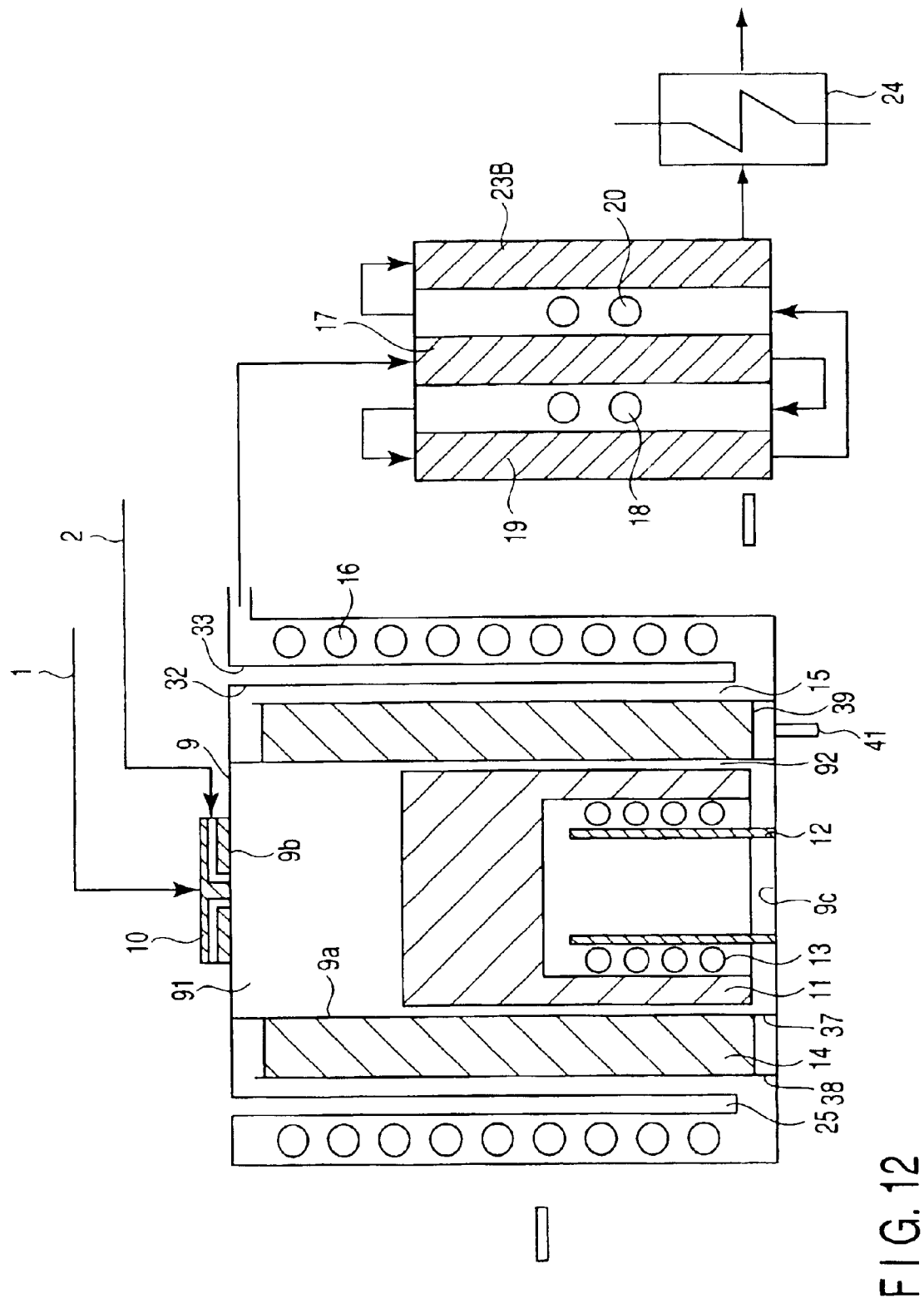
FIG. 12 is a vertical cross-sectional view showing the fuel reforming apparatus for a polymer electrolyte membrane fuel cell according to a tenth embodiment of the present invention.

FIG. 12 is a vertical cross-sectional view schematically showing the construction of a fuel reforming apparatus for a polymer electrolyte membrane fuel cell according to a tenth embodiment of the present invention. In the embodiment shown in FIG. 12, each of the first stage carbon monoxide converting catalyst layer 17, the intermediate cooling device 18 for the carbon monoxide converting catalyst layer, the second stage carbon monoxide converting catalyst layer 19, the cooling device 20 for cooling the inlet port of the carbon monoxide selective oxidizing catalyst layer 20, and a carbon monoxide selective oxidizing catalyst layer 23B is formed to have a parallelepiped outer shape. Also, the intermediate cooling device 18 for the carbon monoxide converting catalyst layer and the cooling device 20 for cooling the inlet port of the carbon monoxide converting catalyst layer are allowed to abut against the side surfaces of the first stage carbon monoxide converting catalyst layer 17. Further, the second stage carbon monoxide converting catalyst layer 19 is allowed to abut against the intermediate cooling device 18 for the carbon monoxide converting catalyst layer. Still further, the carbon monoxide selective oxidizing catalyst layer 23B is allowed to abut against the cooling device 20 for cooling the inlet port of the carbon monoxide selective oxidizing catalyst layer.

The construction shown in FIG. 12 produces prominent functions and effects as described in the following. Specifically, the reforming gas cooled in the cooling device 16 for cooling the inlet gas of the carbon monoxide converting catalyst layer is introduced into the first stage carbon monoxide converting catalyst layer 17 shaped in the form of a parallelepiped for lowering the CO concentration, which is about 10%, to about several percent. Then, the reforming gas flows into the intermediate cooling device 18 for the carbon monoxide converting catalyst layer shaped in the form of a parallelepiped through a connecting pipe so as to be cooled.

Further, the CO concentration in the reforming gas is lowered to about several thousand ppm in the second stage carbon monoxide converting catalyst layer 19 formed in the shape of a parallelepiped, and then the reforming gas is introduced into the cooling device 20 for cooling the inlet port of the carbon monoxide selective oxidizing catalyst layer, which is formed in the shape of a parallelepiped, so as to be cooled. Still further, the reforming gas mixed with oxygen or air is introduced into the carbon monoxide selective oxidizing catalyst layer 23B formed in the shape of a parallelepiped and arranged on the opposite side of the second stage carbon monoxide converting catalyst layer 19 with the first stage carbon monoxide converting catalyst layer 17 interposed between the catalyst layer 23B and the catalyst layer 19 so as to oxidize Co and lower the CO concentration to several to scores of ppm. It is possible to mix oxygen or air with the reforming gas either on the inlet side or outlet side of the cooling device 20 for cooling the inlet port of the carbon monoxide selective oxidizing catalyst layer. However, it is more desirable to mix oxygen or air with the reforming gas on the inlet side of the cooling device 20.

The temperature of the reforming gas having a lowered CO concentration is lowered in a cooling device 24 mounted to the outlet port of the carbon monoxide selective oxidizing catalyst layer to about 50 to 90° C., which is substantially equal to the operating temperature of a polymer electrolyte membrane fuel cell, so as to prevent the collapse of the temperature balance in the polymer electrolyte membrane fuel cell.

In the embodiment shown in each of FIGS. 8 to 11, the constituting members of the fuel reforming apparatus ranging between the first stage carbon monoxide converting catalyst layer 17 and the second stage carbon monoxide converting catalyst layer 19 or the cooling device 20 for cooling the carbon monoxide selective oxidizing catalyst layer are shaped cylindrical and formed integral. However, if these constituting members are shaped parallelepiped and formed integral together with the carbon monoxide selective oxidizing catalyst layer on the downstream side, it is possible to decrease the volume occupied by the entire apparatus.

It should also be noted that, in the embodiment shown in FIG. 12, the first stage carbon monoxide converting catalyst layer 17 having the highest temperature is sandwiched between the second stage carbon monoxide converting catalyst layer 19 and the carbon monoxide selective oxidizing catalyst layer 23 each having a temperature lower the temperature of the catalyst layer 17 so as to suppress the heat dissipation to the minimum level.

Figure 13:
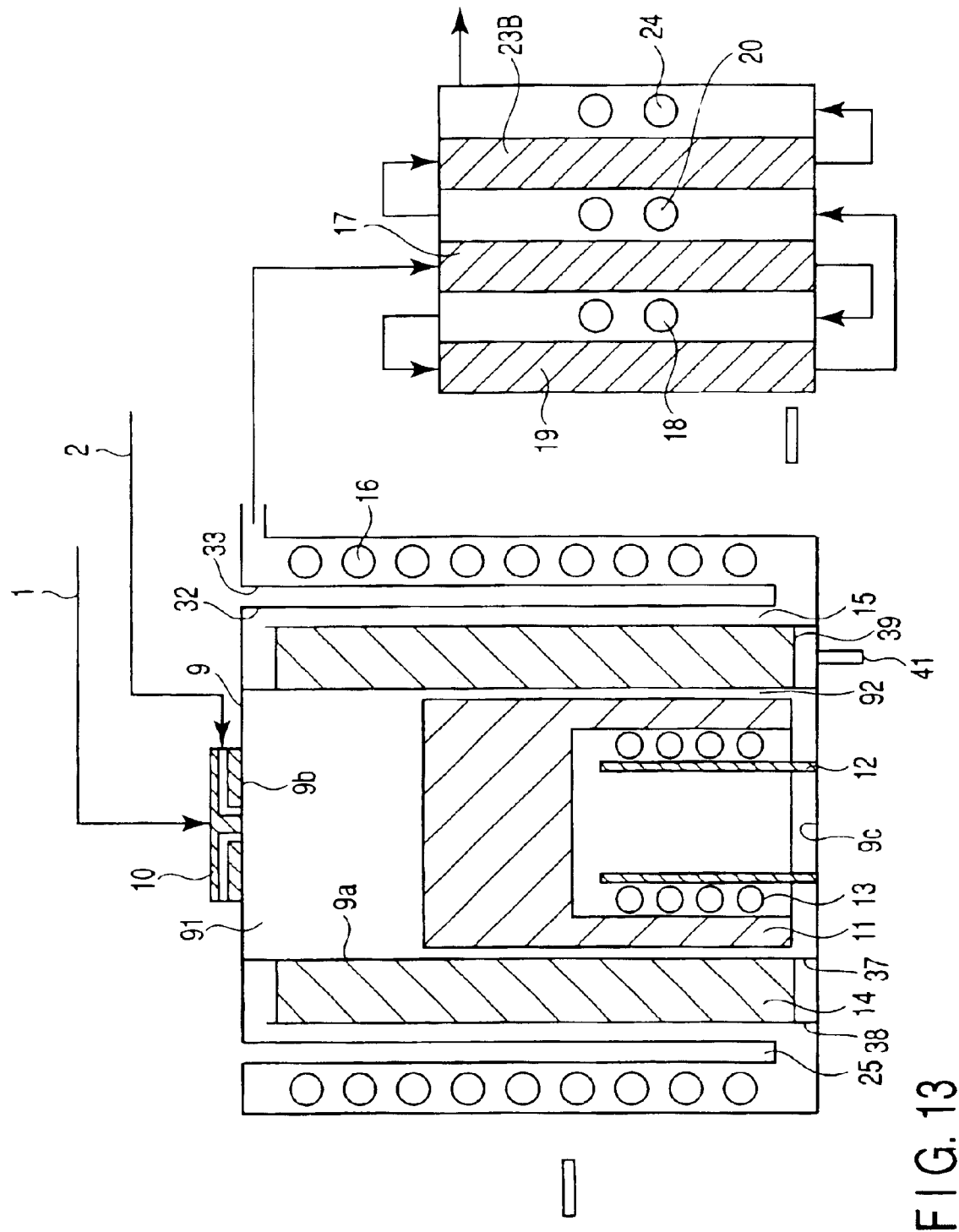
FIG. 13 is a vertical cross-sectional view showing the fuel reforming apparatus for a polymer electrolyte membrane fuel cell according to an eleventh embodiment of the present invention.

FIG. 13 is a vertical cross-sectional view schematically showing the construction of a fuel reforming apparatus for a polymer electrolyte membrane fuel cell according to an eleventh embodiment of the present invention. In the embodiment shown in FIG. 13, the cooling device 24 mounted on the outlet port of the carbon monoxide selective oxidizing catalyst layer and having a parallelepiped outer shape is allowed to abut against carbon monoxide selective oxidizing catalyst layer 23B included in the embodiment shown in FIG. 12 so as to make integral the constituting members of the fuel reforming apparatus. As a result, it is possible to further decrease the volume occupied by the entire apparatus.

Figure 14:
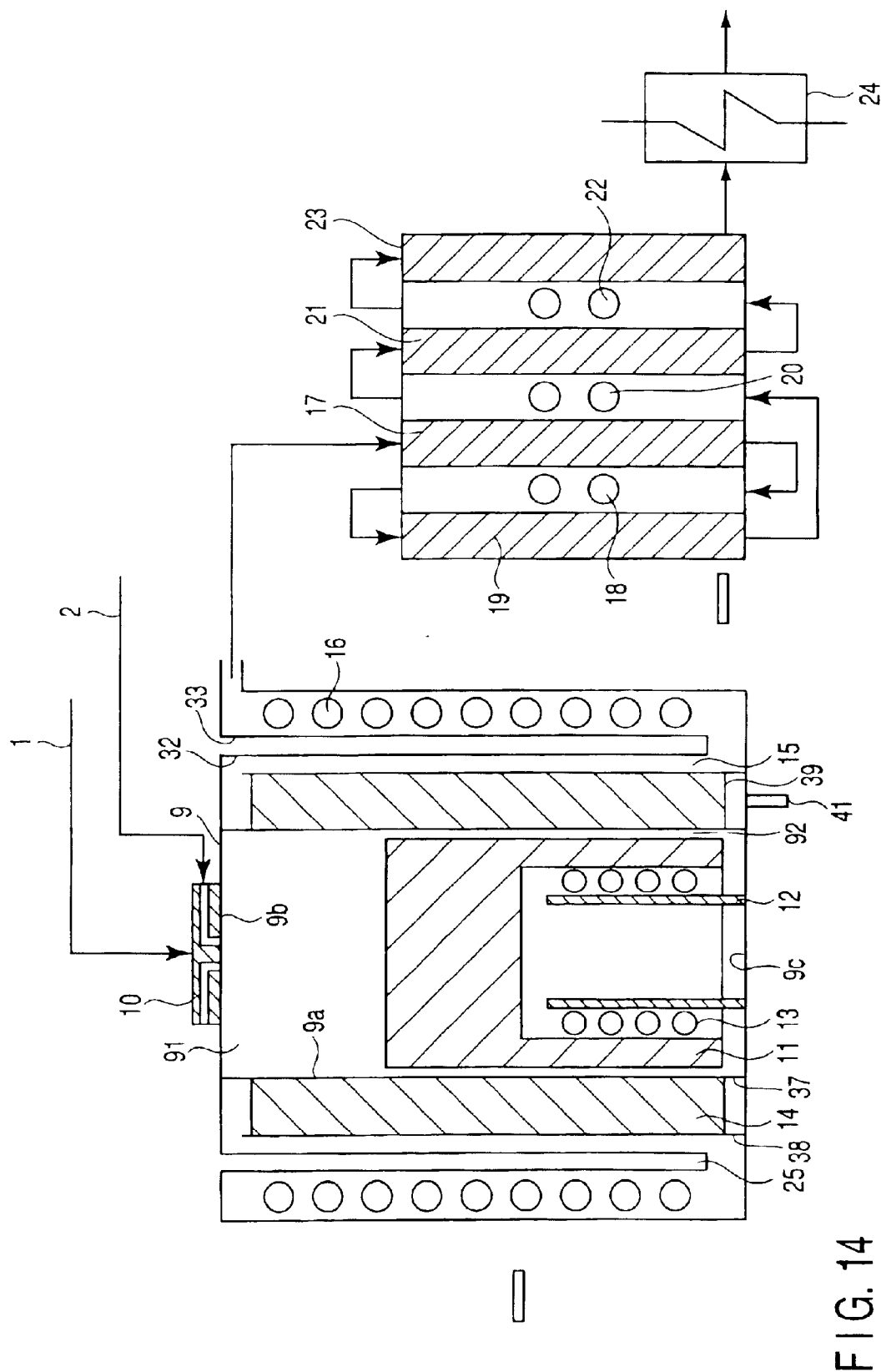
FIG. 14 is a vertical cross-sectional view showing the fuel reforming apparatus for a polymer electrolyte membrane fuel cell according to a twelfth embodiment of the present invention.

FIG. 14 is a vertical cross-sectional view schematically showing the construction of a fuel reforming apparatus for a polymer electrolyte membrane fuel cell according to a twelfth embodiment of the present invention. The twelfth embodiment differs from the embodiment shown in FIG. 12 in that the carbon monoxide selective oxidizing catalyst layer 23B shown in FIG. 12 is divided into a first stage carbon monoxide selective oxidizing catalyst layer 21 and a second stage carbon monoxide selective oxidizing catalyst layer 23. Also, an intermediate cooling device 22 for the carbon monoxide selective oxidizing catalyst layer is arranged between the first stage and second stage carbon monoxide selective oxidizing catalyst layers 21 and 23. Further, these catalyst layers 21, 23 and the intermediate cooling device 22 are formed in the shape of a parallelepiped and formed integral.

Oxygen or air is reformed and mixed with the reforming gas upstream of each of the first stage carbon monoxide selective oxidizing catalyst layer 21 and the second stage carbon monoxide selective oxidizing catalyst layer 23. When it comes to oxygen or air mixed with the reforming gas for the first stage carbon monoxide selective oxidizing catalyst layer 21, it is possible to mix the oxygen or air with the reforming gas either on the inlet side or outlet side of the cooling device 20 for cooling the inlet port of the carbon monoxide selective oxidizing reactor 20. However, it is more desirable to mix the oxygen or air on the inlet side of the cooling device 20. Likewise, when it comes to oxygen or air mixed with the reforming gas for the second stage carbon monoxide selective oxidizing catalyst layer 23, it is possible to mix the oxygen or air with the reforming gas either on the inlet side or outlet side of the intermediate cooling device 22 for cooling the carbon monoxide selective oxidizing catalyst layer. However, it is more desirable to mix the oxygen or air on the inlet side of the intermediate cooling device 22.

It is disadvantageous in terms of the occupied area to divide the carbon monoxide selective oxidizing catalyst layer 23B as shown in FIG. 14. However, the temperature elevation in the carbon monoxide selective oxidizing catalyst can be controlled easily, and the amount of $H_2$ consumed by the side reaction can be decreased in the case of dividing the catalyst layer 23B shown in FIG. 12.

Incidentally, it is possible to divide the second stage carbon monoxide selective oxidizing catalyst layer 23 into three or four portions and to arrange intermediate cooling devices between the adjacent divided portions, though such a division is disadvantageous in terms of the occupied volume.

Figure 15:
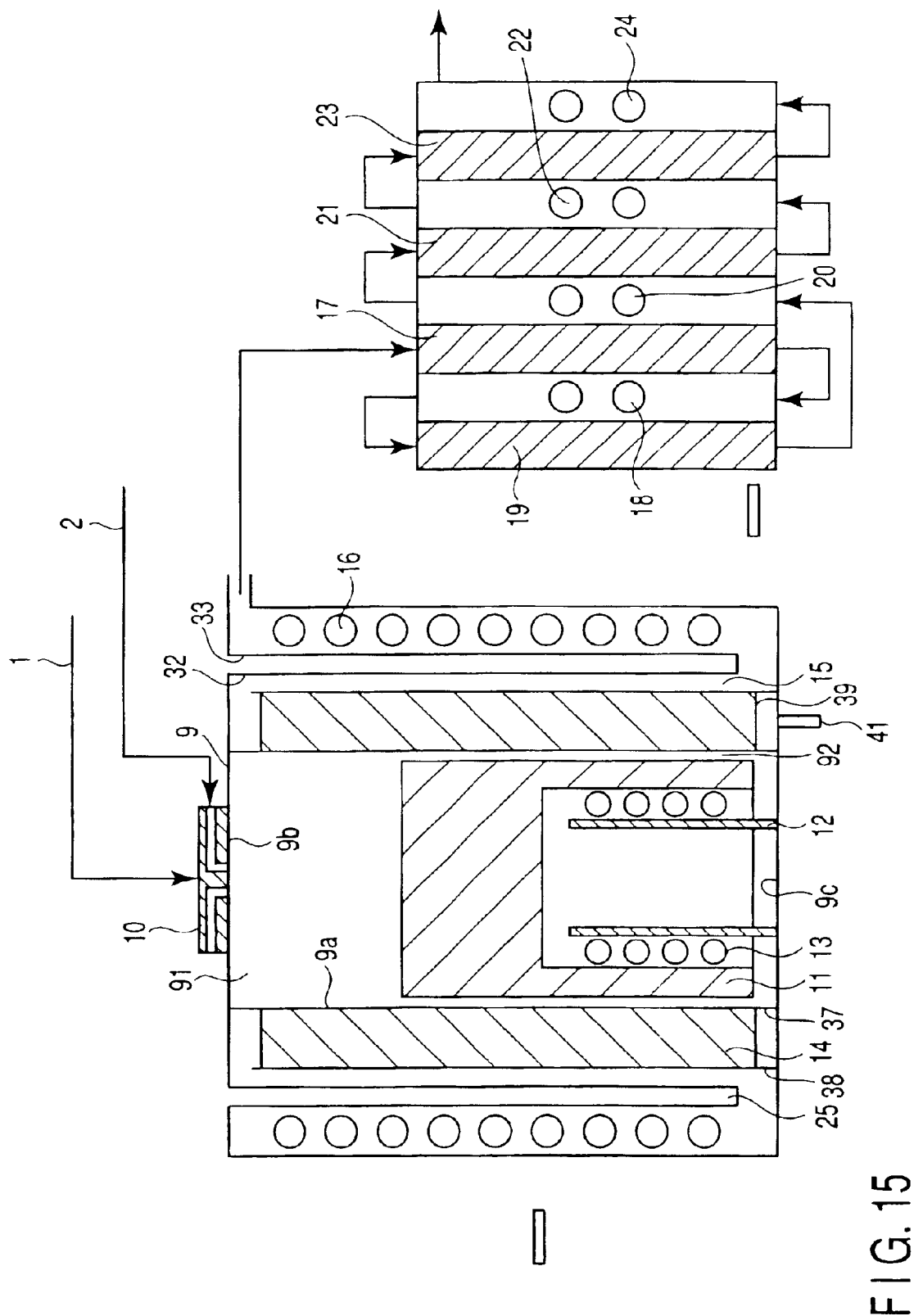
FIG. 15 is a vertical cross-sectional view showing the fuel reforming apparatus for a polymer electrolyte membrane fuel cell according to a thirteenth embodiment of the present invention.

FIG. 15 is a vertical cross-sectional view schematically showing the construction of a fuel reforming apparatus for a polymer electrolyte membrane fuel cell according to a thirteenth embodiment of the present invention. The thirteenth embodiment differs from the embodiment shown in FIG. 13 in that the carbon monoxide selective oxidizing catalyst layer 23B shown in FIG. 13 is divided into a first stage carbon monoxide selective oxidizing catalyst layer 21 and a second stage carbon monoxide selective oxidizing catalyst layer 23. Also, an intermediate cooling device 22 for the carbon monoxide selective oxidizing catalyst layer is arranged between the first stage and second stage carbon monoxide selective oxidizing catalyst layers 21 and 23. Further, these catalyst layers 21, 23 and the intermediate cooling device 22 are formed in the shape of a parallelepiped and formed integral.

The amount of $H_2$ consumed by the side reaction can be decreased in the case of dividing the carbon monoxide selective oxidizing catalyst layer 22B into the catalyst layers 21 and 23, as described previously in conjunction with the embodiment shown in FIG. 14.

Figure 16:
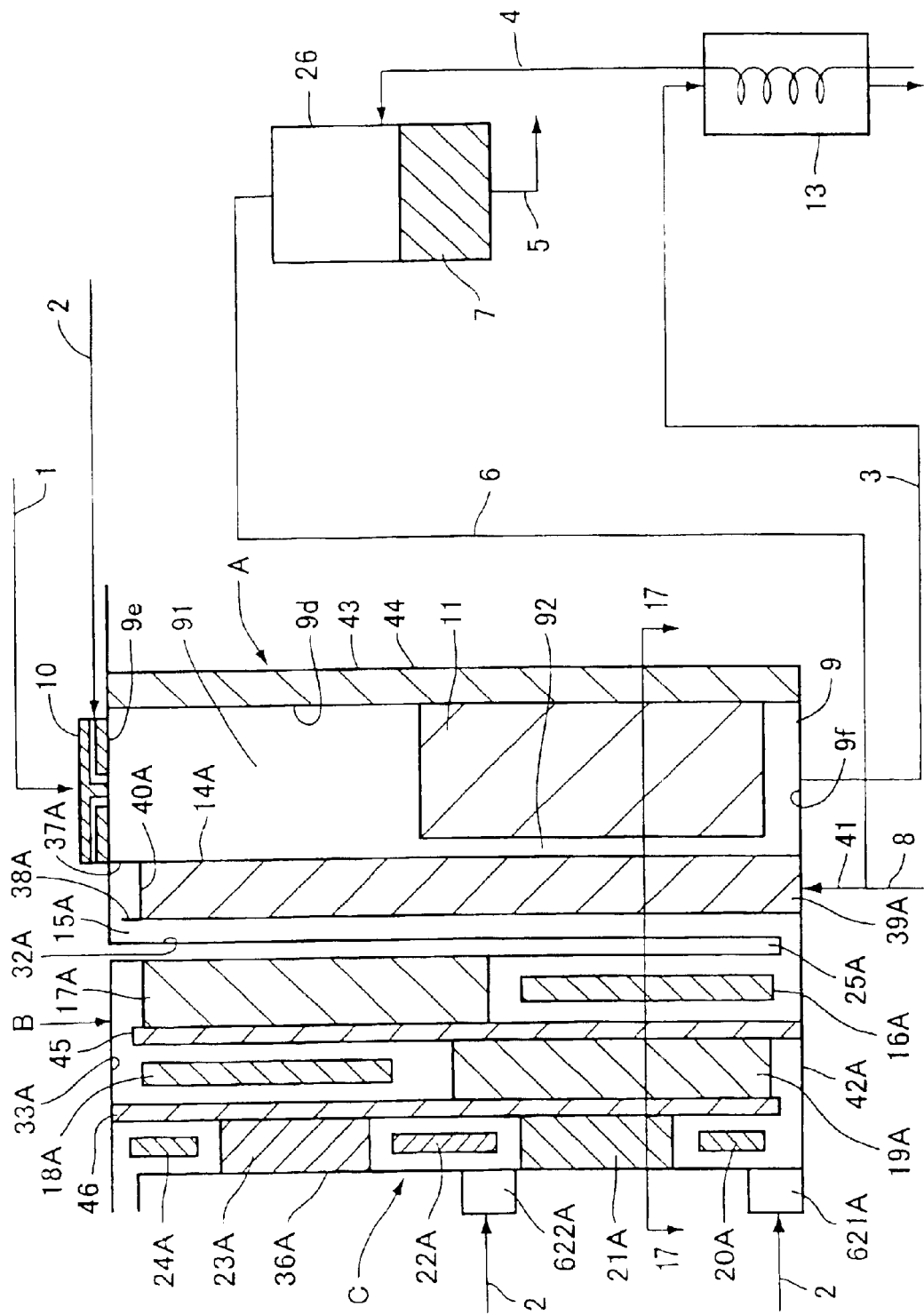
FIG. 16 is a vertical cross-sectional view showing the fuel reforming apparatus for a polymer electrolyte membrane fuel cell according to a fourteenth embodiment of the present invention.
Figure 17:
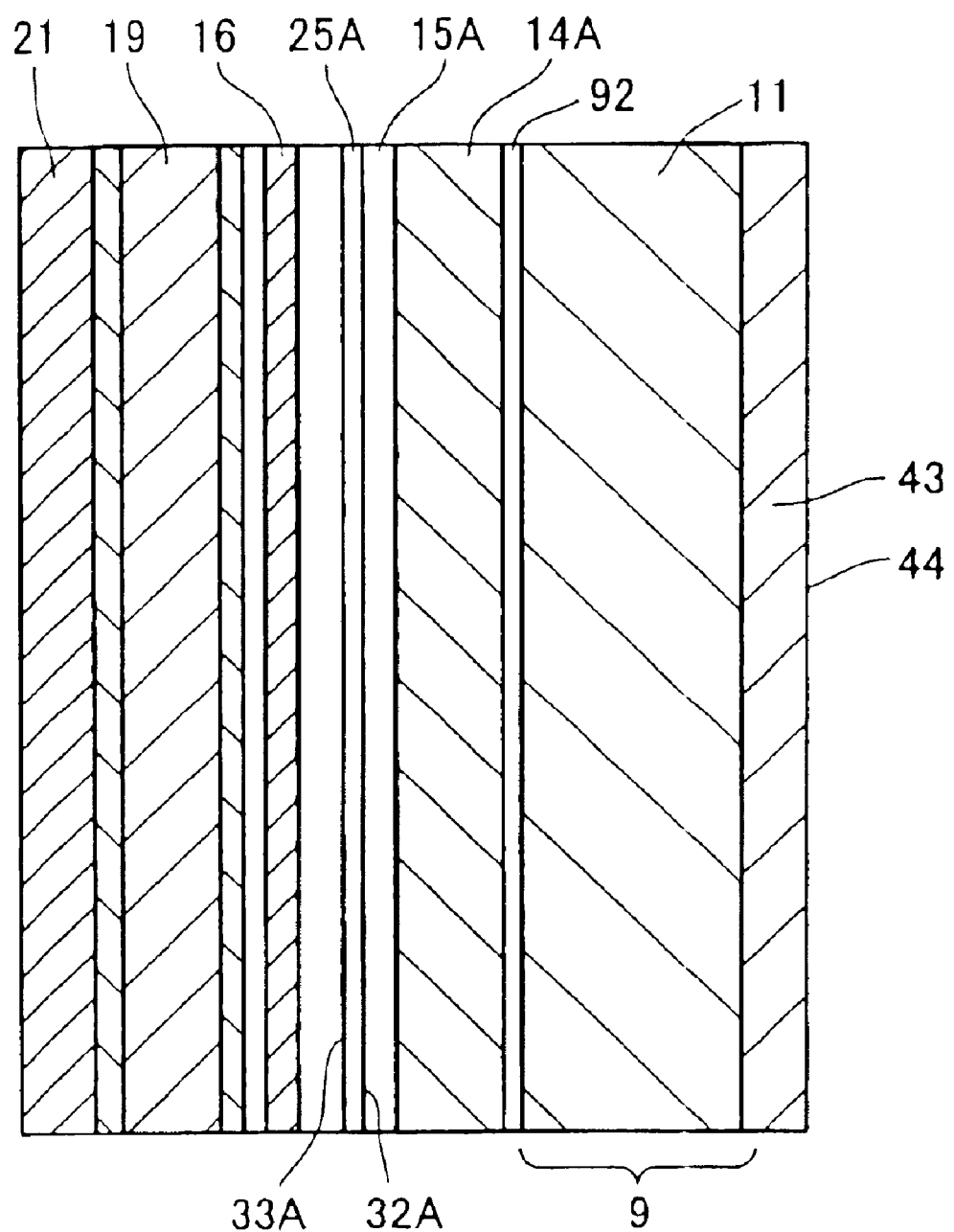
FIG. 17 is a horizontal cross-sectional view along the line 17—17 shown in FIG. 16, which is viewed in the direction denoted by arrows.

FIG. 16 is a vertical cross-sectional view schematically showing the construction of a fuel reforming apparatus for a polymer electrolyte membrane fuel cell according to a fourteenth embodiment of the present invention, and FIG. 17 is a horizontal cross-sectional view along the line 17—17 shown in FIG. 16 as viewed in the direction denoted by arrows.

In the fuel reforming apparatus for a polymer electrolyte membrane fuel cell collectively shown in FIGS. 16 and 17, the reformer A of the construction described below, the carbon monoxide converter B, the carbon monoxide selective oxidizing reactor C, the cooling device for cooling the inlet gas of the carbon monoxide converter, and the cooling device 20 for cooling the inlet port of the carbon monoxide selective oxidizing reactor are formed in the shape of a parallelepiped. Also, the reformer A, the carbon monoxide converter B, and the carbon monoxide selective oxidizing reactor C are arranged in the order mentioned so as to combine these reactors and, thus, to form an integral entire apparatus.

The reformer A comprises a burner space chamber 9 formed of a hollow member 9d having a square cross section, having the upper and lower open portions closed with a lid member 9e and a bottom member 9f, respectively, and having a radiation heat transmitting section 91 and a convection heat transmission section 92 formed therein; a plate-like partition wall 37A including a heat insulating material 44 arranged on the outer circumferential surface of a metal plate 43 on one side surface (side surface on the right side in the drawing) of the hollow member 9d having a square cross section and fixed to the hollow member 9d having a square cross section and the bottom member 9f on the other side surface (side surface on the left side in the drawing) of the hollow member 9d having a square cross section; a plate-like partition wall 38A fixed to the bottom member 9f and arranged a prescribed distance apart from the partition wall 37A; a plate-like reforming catalyst layer 14A arranged between the partition wall 37 and the partition wall 38A; partition walls 39A, 40A arranged on the lower position and the upper position of the reforming catalyst layer 14A and fixed to prescribed positions of the partition wall 38A and the partition wall 37A, respectively; a gas introducing port 41 formed in a part on the lower end portion of the reforming catalyst layer 14 for introducing a reforming fuel 8 consisting of, for example, a natural gas and a reforming fuel into the reforming catalyst layer 14A; and a modified L-shaped fluid passageway-forming member 32A having an L-shaped flange on the side of one end portion and fixed to the lid member 9e above the partition wall 40A, along the outer circumferential surfaces of the reforming catalyst layer 14A and the partition wall 38A, and above the reforming catalyst layer 14A (on the side opposite to the side on which the gas introducing port 41 is formed) so as to form a regenerating fluid passageway 15A.

The reformer A also comprises a modified L-shaped partition wall 33A arranged outside the fluid passageway-forming member 32A in a manner to form a parallelepiped clearance (heat insulating layer) 25A, having an L-shaped flange on the side of one end, and connected to the lower end portion of the fluid passageway-forming member 32A; a cooling device 16A arranged below the partition wall 33A and formed in the shape of, for example, a box; a first stage carbon monoxide converting catalyst layer 17A arranged on the upper side of the partition wall 33A and shaped like, for example, a plate; a plate-like heat insulating member 45 formed on the side surfaces of the carbon monoxide converting catalyst layer 17A and the cooling device 16A for cooling the inlet port of the carbon monoxide converter and having one end portion fixed to the bottom member 42A connected to the bottom member 9f; a cooling device 18A such as a cooling jacket arranged on the upper side of the heat insulating member 45 and shaped like, for example, a box; a second stage carbon monoxide converting catalyst layer 19A arranged on the lower side of the heat insulating material 45 and shaped like, for example, a plate; a plate-like heat insulating material 46 arranged on the side surfaces of the cooling device 18A and the carbon monoxide converting catalyst layer 19A and connected to the flange of the partition wall 33A; a cooling device 20A for cooling the inlet port of the parallelepiped carbon monoxide selective oxidizing catalyst layer (cooling device arranged upstream of the carbon monoxide selective oxidizing catalyst layer) arranged to extend from the lower side toward the upper side along the side surface of the heat insulating material 46; a parallelepiped first stage carbon monoxide selective oxidizing catalyst layer 21A; an intermediate cooling device 22A for the parallelepiped carbon monoxide selective oxidizing catalyst layer; a parallelepiped second stage carbon monoxide selective oxidizing catalyst layer 23A; a cooling device 24A for cooling the outlet port of the parallelepiped carbon monoxide selective oxidizing catalyst layer (cooling device arranged downstream of the carbon monoxide selective oxidizing catalyst layer); and a plate-like partition wall 36A arranged to cover the side surfaces of the cooling device 20A, the carbon monoxide selective oxidizing catalyst layer 21A, the intermediate cooling device 22A for the carbon monoxide selective oxidizing catalyst layer and the carbon monoxide selective oxidizing catalyst layer 23A and the edge portions fixed to the flange of the partition wall 33A and the bottom member 42A. Further, air headers 621A and 622A are arranged on the outer circumferential surface of the partition wall 36A.

The operation of the fourteenth embodiment is equal to that of the first embodiment described previously. To reiterate, a combustion fuel 1 for the fuel cell stack (not shown) is introduced into the burner 10 so as to be burned within the burner space chamber 9, with the result that the heat having a temperature not lower than 1,000° C. is generated. The burner gas imparts heat to the reforming catalyst layer, and burner exhaust gas with a lowered temperature is discharged from the reforming catalyst layer 14A itself so as to be utilized as a heat source of the evaporator 13 and, then, exhausted.

In this case, the heat is effectively transmitted to the reformer A by the radiation heat transmission and the convection heat transmission because the center plug 11 is arranged within the burner space chamber 9.

On the other hand, the reforming fuel 8 is mixed with the steam 6 generated from the gas-liquid separator 26 and, then, circulated into the reforming catalyst layer 14 under the state that the mixed gas has substantially atmospheric pressure. As described previously, the heat of the burner gas is imparted to the reforming catalyst layer 14A and, thus, a reforming reaction is brought about within the reforming catalyst layer 14A. In this case, substantially 100% of the fuel 8 is involved in the reforming reaction so as to form hydrogen, carbon monoxide and carbon dioxide. Since the reforming gas containing these formed materials and the unreacted steam have a high temperature, heat is exchanged with the reforming catalyst layer 14 when the reforming gas passes through the regeneration fluid passageway 15A, with the result that the waste heat is recovered.

The reforming gas immediately after passing through the regenerating fluid passageway 15A has a high temperature of about 400° C. to 500° C. and, thus, is allowed to pass through the surroundings of the cooling device 16 before entering the first stage carbon monoxide converting catalyst layer 17A so as to be cooled to 200° C. to 300° C. The reforming gas cooled to have a low temperature is allowed to flow into the carbon monoxide converting catalyst layer 17A so as to bring about a so-called "shift reaction" in which the reforming gas reacts with the carbon monoxide and the steam generated in the reforming catalyst layer so as to generate carbon dioxide and hydrogen.

Since the shift reaction is an exothermic reaction, the temperature of the reforming gas is elevated while the reforming gas passes through the catalyst layer, and the reaction substantially reaches the state of equilibrium when the reforming gas comes out of the carbon monoxide converting catalyst layer 17A. The reforming gas passing through the first stage carbon monoxide converting catalyst layer 17A is cooled to have a low temperature while passing through the surroundings of the cooling device 18A so as to be put again in the state adapted for the shift reaction. Since the equilibrium concentration of the cooled reforming gas is lowered with a decrease in temperature, the shift reaction proceeds again while the cooled reforming gas passes through the second stage carbon monoxide converting catalyst layer 19A, with the result that the carbon monoxide concentration is lowered to about 5,000 ppm in accordance with the temperature elevation.

Further, the reforming gas is mixed with the air supplied from the air introducing header 621A, and then flows into the first stage carbon monoxide selective oxidation catalyst layer 21 through the surroundings of the cooling device 20 under the state that the temperature of the reforming gas is lowered. While the reforming gas passes through the carbon monoxide selective oxidation catalyst layer 21A, the carbon monoxide contained in the reforming gas reacts with the oxygen in the air so as to be converted into carbon dioxide. Since this converting reaction is a reaction generating a large amount of heat, the reforming gas is rapidly heated to a high temperature.

Then, the reforming gas is cooled by the cooling device 22A and mixed again with traces of the air supplied from the air introducing header 622A. The selective oxidizing reaction proceeds again while the reforming gas mixed with the air flows through the second stage carbon monoxide selective oxidation catalyst layer 23A, with the result that the carbon monoxide concentration is lowered to 10 ppm or less in accordance with the temperature elevation. Then, the reforming gas is cooled by the cooling device 24A so as to be supplied into the fuel cell stack.

According to the fourteenth embodiment of the present invention described above, the construction shown in FIG. 16 permits the entire apparatus to be shaped rectangular so as to make the fuel reforming apparatus compact like the cylindrical fuel reforming apparatus according to the first embodiment of present invention described previously.

Also, in the fourteenth embodiment of the present invention, the carbon monoxide converting catalyst layer is divided into the first stage and second stage carbon monoxide converting catalyst layers 17A and 19A, and the cooling device 18A is arranged intermediate between these catalyst layers 17A and 19A, as shown in FIG. 16 as in the first embodiment described previously. As a result, it is unnecessary to bury a heat transmitting pipe in the catalyst layer as in the prior art so as to make it possible to decrease the width of the catalyst layer and, thus, to miniaturize the fuel reforming apparatus for a polymer electrolyte membrane fuel cell. Needless to say, it is also possible to divide the catalyst layer more finely and to arrange cooling devices between the adjacent divided sections of the catalyst layer, with substantially the same effect.

Also, in the fourteenth embodiment of the present invention, the carbon monoxide selective oxidizing catalyst layer is divided into the first stage and second stage carbon monoxide selective oxidizing catalyst layers 21A and 23A, and the cooling device 22A is arranged intermediate between these catalyst layers 21A and 23A, as shown in FIG. 16 as in the first embodiment described previously. As a result, the region locally heated to a high temperature is decreased, compared with the prior art in which a heat transmitting pipe is buried in the catalyst layer for cooling purposes. It follows that it suffices to use the minimum required amount of the catalyst, and the entire apparatus can be made compact. Needless to say, the locally heated high temperature portion can be further decreased if the catalyst layer is more finely divided and cooling devices are arranged between the adjacent divided sections of the catalyst layer.

Also, in the fourteenth embodiment of the present invention, the cooling device 24A is arranged downstream of the carbon monoxide selective oxidizing catalyst layer 23A as shown in FIG. 16 as in the first embodiment described previously. As a result, the region locally heated to a high temperature is decreased, compared with the prior art in which a heat transmitting pipe is buried in the catalyst layer for the cooling purpose. It follows that it suffices to use the minimum required amount of the catalyst, and the entire apparatus can be made compact.

Also, in the fourteenth embodiment of the present invention, the clearance (heat insulating layer) 25A is arranged as shown in FIG. 16, as in the first embodiment described previously. As a result, even if the reformer portion generally having a high temperature of 500° C. to 1,000° C. is arranged adjacent to the carbon monoxide converter or the carbon monoxide selective oxidizing reactor having a temperature of about 100° C. to 300° C., it is possible to suppress the load given by the heat leakage to the cooling devices 16A, 18B, 20B, 22B and 24B. Also, it is possible to absorb the difference in elongation caused by the thermal expansion of the partition wall, which is brought about by the reformer having a high temperature level and the carbon monoxide converter having a low temperature level, so as to suppress the thermal stress. It follows that it is possible to overcome the problems in terms of the construction and the mechanical strength so as to make it possible to miniaturize the fuel reforming apparatus.

It should also be noted that, in the fourteenth embodiment of the present invention, it is possible to allow a mixture of the reforming fuel 8 and the steam 6 to flow into the cooling device 16A arranged upstream of the first stage carbon monoxide converting catalyst layer as in the first embodiment described previously. The particular construction permits cooling the reforming gas and also permits heat recovery so as to make it possible to enhance the system efficiency of the fuel cell system.

Further, in the fourteenth embodiment of the present invention, it is possible to allow the gas-liquid mixture coming out of, for example, the evaporator 13 to flow into the cooling device 18A arranged intermediate between the carbon monoxide converting catalyst layers. The particular construction permits cooling the reforming gas and also permits heat recovery so as to make it possible to enhance the system efficiency of the fuel cell system.

Figure 18:
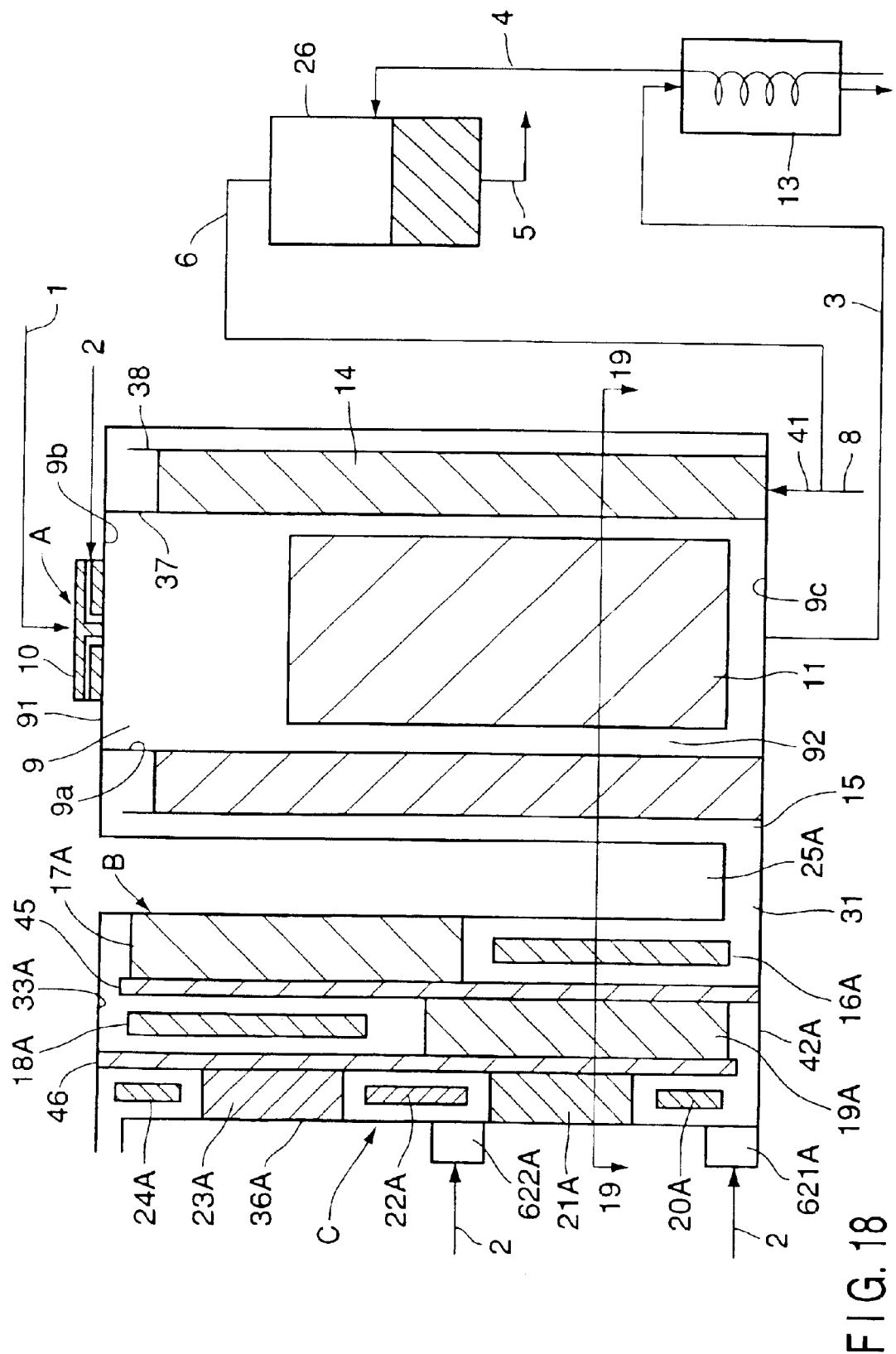
FIG. 18 is a vertical cross-sectional view showing the fuel reforming apparatus for a polymer electrolyte membrane fuel cell according to a fifteenth embodiment of the present invention.
Figure 19:
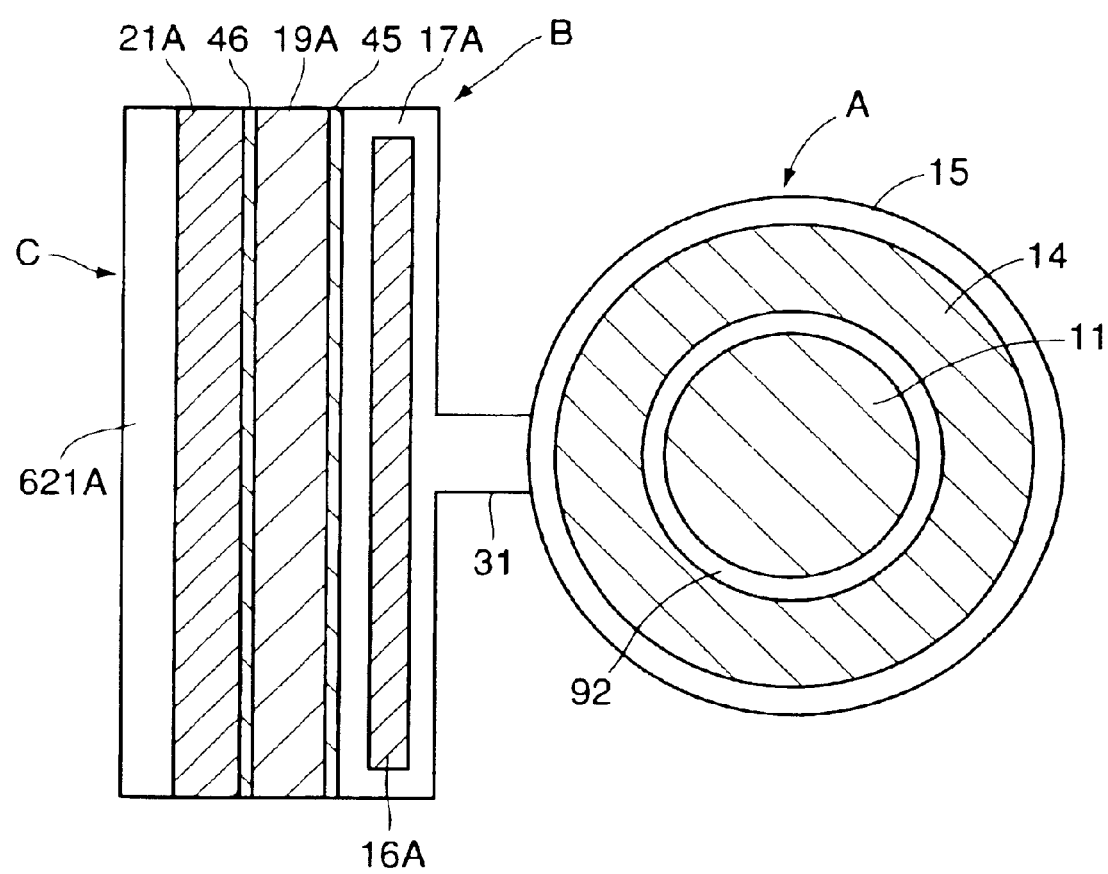
FIG. 19 is a horizontal cross-sectional view along the line 19—19 shown in FIG. 18, which is viewed in the direction denoted by arrows.
Figure 20:
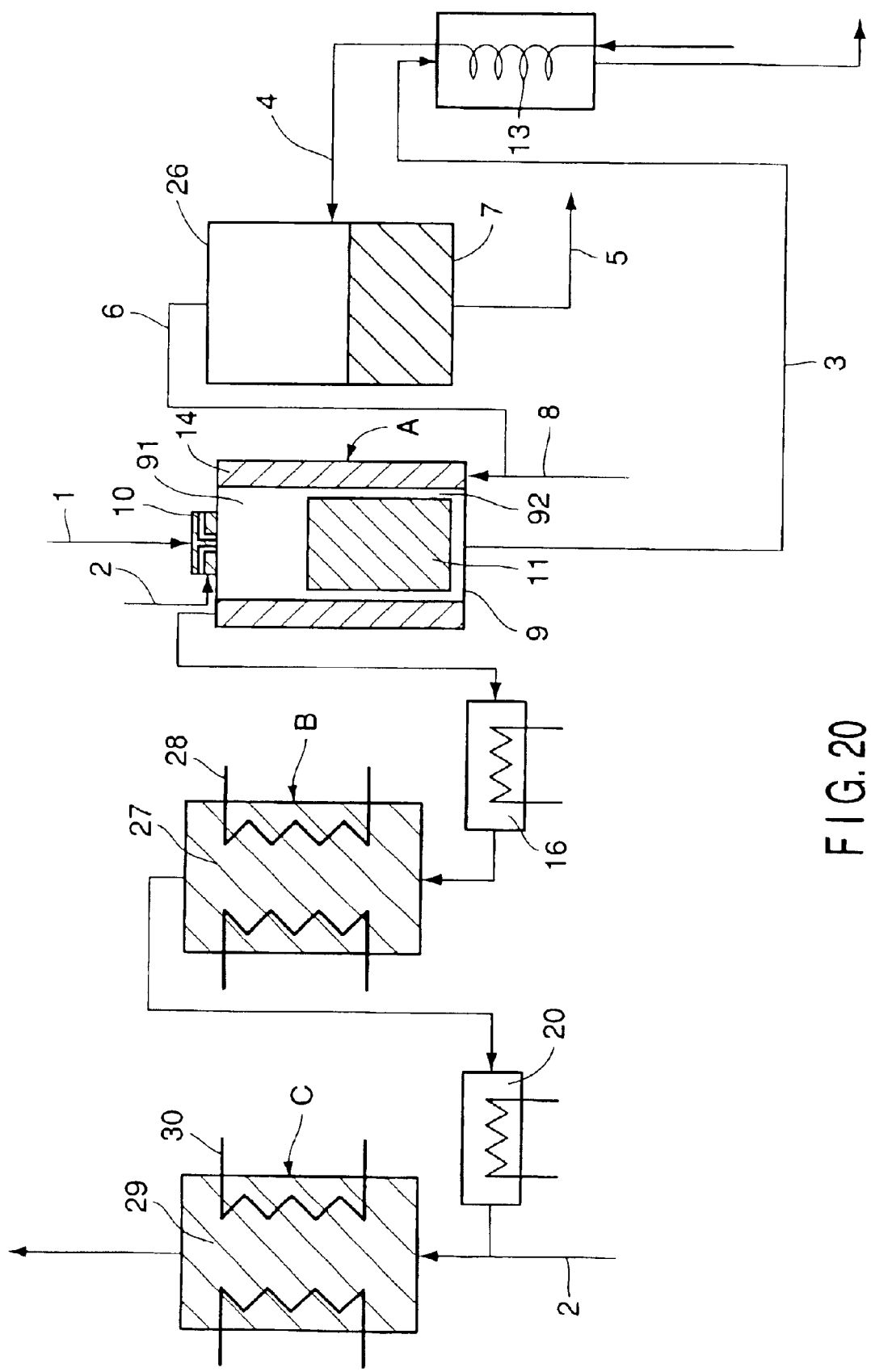
FIG. 20 schematically exemplifies the construction of the conventional fuel reforming apparatus for a polymer electrolyte membrane fuel cell.

FIG. 18 is a vertical cross-sectional view schematically showing the construction of a fuel reforming apparatus for a polymer electrolyte membrane fuel cell according to a fifteenth embodiment of the present invention, and FIG. 19 is a horizontal cross-sectional view along the line 19—19 shown in FIG. 18 as viewed in the direction denoted by arrows.

In the fifteenth embodiment, the reformer A is formed substantially cylindrical as in the first embodiment, and the apparatuses other than the reformer A are formed substantially parallelepiped as in the fourteenth embodiment described above. To be more specific, the carbon monoxide converter B, the carbon monoxide selective oxidizing reactor C, the cooling device 16A for cooling the inlet port of the carbon monoxide converter, and the cooling device 20A for cooling the inlet port of the carbon monoxide selective oxidizing reactor are formed in the shape of a parallelepiped. Also, the reformer A, the carbon monoxide converter B, and the carbon monoxide selective oxidizing reactor C are arranged in the order mentioned so as to combine these reactors and, thus, to form an integral entire apparatus.

The operation of the fifteenth embodiment is equal to that of the first embodiment and the second embodiment described previously. To reiterate, a combustion fuel 1 for the fuel cell stack is introduced into the burner 10 so as to be burned within the burner space chamber 9, with the result that the heat having a temperature not lower than 1,000° C. is generated. The burner gas imparts heat to the reforming catalyst layer 14, and a burner exhaust gas with a lowered temperature is discharged from the reforming catalyst layer 14 itself as a burner exhaust gas 3 so as to be utilized as a heat source of the evaporator 13 and, then, exhausted.

In this case, the heat is effectively transmitted to the reformer A by the radiation heat transmission and the convection heat transmission because the center plug 11 is arranged within the burner space chamber 9.

On the other hand, the reforming fuel 8 is mixed with the steam 6 generated from the gas-liquid separator 26 and then circulated into the reforming catalyst layer 14 under the state that the mixed gas has substantially atmospheric pressure. As described previously, the heat of the burner gas is imparted to the reforming catalyst layer 14A and, thus, a reforming reaction is brought about within the reforming catalyst layer 14A. In this case, substantially 100% of the fuel 8 is involved in the reforming reaction so as to form hydrogen, carbon monoxide and carbon dioxide. Since the reforming gas containing these formed materials and the unreacted steam have a high temperature, heat is exchanged with the reforming catalyst layer 14 when the reforming gas passes through the regenerating fluid passageway 15A, with the result that the waste heat is recovered.

The reforming gas immediately after passing through the regenerating fluid passageway 15A has a high temperature of about 400° C. to 500° C. and, thus, is allowed to pass through the surroundings of the cooling device 16A before entering the first stage carbon monoxide converting catalyst layer 17A so as to be cooled to 200° C. to 300° C. The reforming gas cooled to have a low temperature is allowed to flow into the carbon monoxide converting catalyst layer 17A so as to bring about a so-called "shift reaction" in which the reforming gas reacts with the carbon monoxide and the steam generated in the reforming catalyst layer so as to generate carbon dioxide and hydrogen. Since the shift reaction is an exothermic reaction, the temperature of the reforming gas is elevated while the reforming gas passes through the catalyst layer, and the reaction substantially reaches the state of equilibrium when the reforming gas comes out of the carbon monoxide converting catalyst layer 17A.

The reforming gas passing through the first stage carbon monoxide converting catalyst layer 17A is cooled to have a low temperature while passing through the surroundings of the cooling device 18A so as to be put again in the state adapted for the shift reaction. Since the equilibrium concentration of the cooled reforming gas is lowered with decrease of the temperature, the shift reaction proceeds again while the cooled reforming gas passes through the second stage carbon monoxide converting catalyst layer 19A, with the result that the carbon monoxide concentration is lowered to about 5,000 ppm in accordance with the temperature elevation.

Further, the reforming gas is mixed with the air supplied from the air introducing headers 621A, 622A, and then flows into the first stage carbon monoxide selective oxidation catalyst layer 21A through the surroundings of the cooling device 20A under the state that the temperature of the reforming gas is lowered. While the reforming gas passes through the carbon monoxide selective oxidation catalyst layer 21A, the carbon monoxide contained in the reforming gas reacts with the oxygen in the air so as to be converted into carbon dioxide. Since this converting reaction is a reaction generating a large amount of heat, the reforming gas is rapidly heated to a high temperature.

Then, the reforming gas is cooled by the cooling device 22A and mixed again with traces of the air supplied from the air introducing header 622A. The selective oxidizing reaction proceeds again while the reforming gas mixed with the air flows through the second stage carbon monoxide selective oxidation catalyst layer 23A, with the result that the carbon monoxide concentration is lowered to 10 ppm or less in accordance with the temperature elevation. Then, the reforming gas is cooled by the cooling device 24A so as to be supplied into the fuel cell stack.

As apparent from the fifteenth embodiment, the heat generated in the burner space chamber 9 can be efficiently transmitted to the catalyst layer by cylindrically constructing the burner space chamber 9, the reforming catalyst layer 14A and regenerating fluid passageway 15 so as to make it possible to save the fuel consumption.

Also, the fuel reforming apparatus can be made compact by forming each of the carbon monoxide converting catalyst layers 17A, 19A, the cooling devices 16A, 18A, 20A, 22A, 24A and the carbon monoxide selective oxidizing catalyst layers 21A, 23A in the shape of a parallelepiped as in the first and second embodiments so as to make it possible to render the fuel reforming apparatus compact.

Further, the high temperature level portion of 500° C. to 1,000° C. can be thermally separated from the intermediate temperature level portion of about 100° C. to 300° C. without taking any measure such as formation of a heat insulating layer by connecting the reformer A to, for example, the carbon monoxide converter B or the carbon monoxide selective oxidizing reactor C by using the pipe 31. Since the leakage of heat from the reformer A having a high temperature to the carbon monoxide converter having an intermediate temperature can be suppressed by the thermal separation noted above, it is possible to miniaturize the cooling device.

Also, in the fifteenth embodiment, the carbon monoxide converting catalyst layer is divided into the first stage and second stage carbon monoxide converting catalyst layers 17A and 19A, and the cooling device 18A is arranged between these catalyst layers 17A and 19A as shown in FIG. 18, as in the first and fourteenth embodiments. As a result, it is unnecessary to bury a heat transmitting pipe in the catalyst layer as in the prior art so as to make it possible to decrease the width of the catalyst layer. It follows that it is possible to miniaturize the fuel reforming apparatus for a polymer electrolyte membrane fuel cell. Needless to say, it is possible to divide the catalyst layer more finely and to arrange cooling devices between the adjacent divided sections of the catalyst layer with substantially the same effect.

Further, in the fifteenth embodiment of the present invention, the carbon monoxide selective oxidizing catalyst layer is divided into the first stage and second carbon monoxide selective oxidizing catalyst layers 21A and 23A and the cooling device 22A is arranged between these catalyst layers 21A and 23A as shown in FIG. 18, as in the first and fourteenth embodiments described previously. As a result, the portion locally heated to a high temperature is decreased, compared with the prior art in which a heat transmitting pipe is buried in the catalyst layer. It follows that it suffices to use the minimum required amount of the catalyst so as to make it possible to render the entire apparatus compact. Needless to say, it is possible to divide the catalyst layer more finely and to arrange cooling devices between the adjacent divided sections of the catalyst layer so as to further decrease the portion locally heated to a high temperature.

Also, in the fifteenth embodiment of the present invention, the cooling device 24A is arranged downstream of the carbon monoxide selective oxidizing catalyst layer 23A as shown in FIG. 18, as in the first and fourteenth embodiments described previously. As a result, the portion locally heated to a high temperature is decreased, compared with the conventional method that a heat transmitting pipe is buried in the carbon monoxide selective oxidizing catalyst layer for the cooling purpose. It follows that the entire apparatus can be made compact.

Further, in the fifteenth embodiment of the present invention, it is possible to introduce a mixture of the reforming fuel 8 and the steam 6 into the cooling device 16A arranged upstream of the first stage carbon monoxide converting catalyst layer as in the first and fourteenth embodiments described previously. The particular construction permits cooling the reforming gas and also permits the heat recovery so as to enhance the system efficiency of the fuel cell system.

Still further, in the fifteenth embodiment of the present invention, it is possible to introduce the gas-liquid mixture coming out of, for example, the evaporator 13 into the cooling device 18 arranged intermediate between the carbon monoxide converting catalyst layers. The particular construction permits cooling the reforming gas and also permits heat recovery so as to enhance the system efficiency of the fuel cell system.

The fuel reforming apparatus for a polymer electrolyte membrane fuel cell provided by the present invention can be utilized as various power sources such as a power source mounted on a vehicle and a stationary power source.

What is claimed is:

1. A fuel reforming apparatus for a polymer electrolyte membrane fuel cell, comprising:
    a reformer capable of taking out a reforming gas containing carbon monoxide, which can be obtained by a reforming reaction carried out by allowing a mixed fuel prepared by mixing a reforming fuel with steam to flow through a reforming catalyst layer, to the outside and having an arcuate surface formed in at least a part of the outer circumferential surface thereof; and
    a carbon monoxide reformer concentrically arranged on the circumferential surface having an arcuate surface of the reformer for taking in carbon monoxide coming from the reformer so as to lower the carbon monoxide concentration by an aqueous gas shift reaction, wherein the carbon monoxide reformer comprises a cooling device for cooling the inlet gas of the carbon monoxide converter, a first stage carbon monoxide converting catalyst layer, an intermediate cooling device for the carbon monoxide converting catalyst layer, and a second stage carbon monoxide converting catalyst layer, which are concentrically arranged such that the reforming gas coming from the reformer flows through the first stage carbon monoxide converting catalyst layer, the intermediate cooling device for the carbon monoxide converting catalyst layer, and the second stage carbon monoxide converting catalyst layer in the order mentioned.

2. A fuel reforming apparatus for a polymer electrolyte membrane fuel cell according to claim 1, comprising a carbon monoxide selective oxidizing reactor concentrically arranged on the outer circumferential surface of the carbon monoxide converter for carrying out an oxidizing reaction by taking in the reforming gas whose carbon monoxide concentration has been lowered by the carbon monoxide converter and mixing the air or oxygen with the reforming gas so as to lower the carbon monoxide concentration.

3. A fuel reforming apparatus for a polymer electrolyte membrane fuel cell according to claim 1, wherein the carbon monoxide selective oxidizing reactor comprises a cooling device for cooling the inlet gas of the carbon monoxide selective oxidizing catalyst layer, a carbon monoxide selective oxidizing catalyst layer, and a cooling device for cooling the outlet port of the carbon monoxide selective oxidizing catalyst layer, which are formed concentric and arranged such that a reforming gas coming from the carbon monoxide converter is allowed to flow into the cooling device for cooling the inlet gas of the carbon monoxide selective oxidizing catalyst layer, the carbon monoxide selective oxidizing catalyst layer, and the cooling device for cooling the outlet port of the carbon monoxide selective oxidizing catalyst layer in the order mentioned.

4. A fuel reforming apparatus for a polymer electrolyte membrane fuel cell according to claim 1, wherein the carbon monoxide selective oxidizing reactor comprises a cooling device for cooling the inlet gas of the carbon monoxide selective oxidizing catalyst layer, a first stage carbon monoxide selective oxidizing catalyst layer, an intermediate cooling device for the carbon monoxide selective oxidizing catalyst layer, a second stage carbon monoxide selective oxidizing reaction catalyst layer, and a cooling device for cooling the outlet port of the carbon monoxide selective oxidizing catalyst layer, which are cylindrical and arranged such that the reforming gas coming from the carbon monoxide converter is allowed to flow into the cooling device for cooling the inlet gas of the carbon monoxide selective oxidizing catalyst layer, the first stage carbon monoxide selective oxidizing catalyst layer, the intermediate cooling device for the carbon monoxide selective oxidizing catalyst layer, the second stage carbon monoxide selective oxidizing catalyst layer, and the cooling device for cooling the outlet port of the carbon monoxide selective oxidizing catalyst layer in the order mentioned.

5. A fuel reforming apparatus for a polymer electrolyte membrane fuel cell according to any one of claims 2 to 4, wherein a heat insulating layer is formed between the outer circumferential surface of the cooling device for cooling the inlet gas of the carbon monoxide converting catalyst layer and the inner circumferential surfaces of the first stage carbon monoxide converting catalyst layer, the intermediate cooling device for the carbon monoxide converting catalyst layer and the second stage carbon monoxide converting catalyst layer, or between the outer circumferential surfaces of the cooling device for cooling the inlet gas of the carbon monoxide converting catalyst layer and the first stage carbon monoxide converting catalyst layer and the inner circumferential surfaces of the intermediate cooling device for the carbon monoxide converting catalyst layer and the second stage carbon monoxide converting catalyst layer.

6. A fuel reforming apparatus for a polymer electrolyte membrane fuel cell, comprising:
a reformer consisting of a concentric reforming catalyst layer capable of taking out a reforming gas containing carbon monoxide, which is obtained by a reforming reaction by allowing a mixed fuel prepared by mixing a reforming fuel with steam to flow, and a flowing passageway-forming member formed to surround the reforming catalyst layer; and
a cooling device for cooling the inlet gas of the carbon monoxide converting catalyst layer consisting of a cylindrical partition wall arranged on the side of the outer circumferential surface of the flowing passageway-forming member included in the reformer and a heat transmitting pipe arranged within the partition wall and cooling the reforming gas outside the pipe by allowing the mixed before introduction into the reforming catalyst layer to flow into the pipe;
wherein all the constituting members of the fuel reforming apparatus are formed integral.

7. A fuel reforming apparatus for a polymer electrolyte membrane fuel cell according to claim 6, further comprising:
a first stage carbon monoxide converting catalyst layer arranged close to the cooling device for cooling the inlet gas of the carbon monoxide converting catalyst layer, formed to have a columnar outer shape, and allowing the reforming gas cooled by the cooling device for cooling the inlet gas of the carbon monoxide converting catalyst layer to flow therethrough; and
an intermediate cooling device for the carbon monoxide converting catalyst layer and a second carbon monoxide converting catalyst layer, which are concentrically arranged around the outer circumferential surface of the first stage carbon monoxide converting catalyst layer;
wherein the reforming gas coming from the reformer is allowed to flow through the cooling device for cooling the inlet gas of the carbon monoxide converting catalyst layer, the first stage carbon monoxide converting catalyst layer, the intermediate cooling device for the carbon monoxide converting catalyst layer, and the second stage carbon monoxide converting catalyst layer in the order mentioned.

8. A fuel reforming apparatus for a polymer electrolyte membrane fuel cell according to claim 6, further comprising:
a first stage carbon monoxide converting catalyst layer arranged close to the cooling device for cooling the inlet gas of the carbon monoxide converting catalyst layer, formed to have a columnar outer shape, and allowing the reforming gas cooled by the cooling device for cooling the inlet gas of the carbon monoxide converting catalyst layer; and
an intermediate cooling device for the carbon monoxide converting catalyst layer, a second stage carbon monoxide converting catalyst layer, and a cooling device for cooling the inlet gas of the carbon monoxide selective oxidizing catalyst layer, which are concentrically arranged to surround the outer circumferential surface of the first stage carbon monoxide converting catalyst layer;
wherein the reforming gas coming from the reformer is allowed to flow through the cooling device for cooling the inlet gas of the carbon monoxide converting catalyst layer, the first stage carbon monoxide converting catalyst layer, the intermediate cooling device for the carbon monoxide converting catalyst layer, the second stage carbon monoxide converting catalyst layer, and the cooling device for cooling the inlet gas of the carbon monoxide selective oxidizing catalyst layer in the order mentioned.

9. A fuel reforming apparatus for a polymer electrolyte membrane fuel cell according to claim 7, wherein a heat insulating layer is formed between the outer circumferential surface of the first stage carbon monoxide converting catalyst layer and the inner circumferential surfaces of the intermediate cooling device for the carbon monoxide converting catalyst layer and a container of the second stage carbon monoxide converting catalyst layer.

10. A fuel reforming apparatus for a polymer electrolyte membrane fuel cell according to claim 8, wherein a heat insulating layer is formed between the outer circumferential surface of the first stage carbon monoxide converting catalyst layer and the inner circumferential surfaces of the intermediate cooling device for the carbon monoxide converting catalyst layer, a container of the second stage carbon monoxide converting catalyst layer, and the cooling device for cooling the inlet gas of the carbon monoxide selective oxidizing catalyst layer.

11. A fuel reforming apparatus for a polymer electrolyte membrane fuel cell according to claim 6, further comprising:
    a first stage carbon monoxide converting catalyst layer having a parallelepiped outer shape and arranged close to the cooling device for cooling the inlet gas of the carbon monoxide converting catalyst layer and allowing a reforming gas cooled by the cooling device for cooling the inlet gas of the carbon monoxide converting catalyst layer to flow therethrough;
    an intermediate cooling device for the carbon monoxide converting catalyst layer and a cooling device for cooling the inlet gas of the carbon monoxide selective oxidizing catalyst layer each having a parallelepiped outer shape and arranged to abut against the surface facing the first stage carbon monoxide converting catalyst layer;
    a second stage carbon monoxide converting catalyst layer having a parallelepiped outer shape and arranged to abut against the intermediate cooling device for the carbon monoxide converting catalyst layer; and
    a carbon monoxide selective oxidizing catalyst layer having a parallelepiped outer shape and arranged to abut against the cooling device for cooling the inlet gas of the carbon monoxide selective oxidizing catalyst layer;
    wherein the reforming gas coming from the reformer is allowed to flow through the cooling device for cooling the inlet gas of carbon monoxide converting catalyst layer, the first stage carbon monoxide converting catalyst layer, the intermediate cooling device for the carbon monoxide converting catalyst layer, the second stage carbon monoxide converting catalyst layer, and the cooling device for cooling the inlet gas of the carbon monoxide selective oxidizing catalyst layer in the order mentioned.

12. A fuel reforming apparatus for a polymer electrolyte membrane fuel cell according to claim 6, further comprising:
    a first stage carbon monoxide converting catalyst layer having a parallelepiped outer shape and arranged close to the cooling device for cooling the inlet gas of the carbon monoxide converting catalyst layer and allowing a reforming gas cooled by the cooling device for cooling the inlet gas of the carbon monoxide converting catalyst layer to flow therethrough;
    an intermediate cooling device for the carbon monoxide converting catalyst layer and a cooling device for cooling the inlet gas of the carbon monoxide selective oxidizing catalyst layer each having a parallelepiped outer shape and arranged to abut against the surface facing the first stage carbon monoxide converting catalyst layer;
    a second stage carbon monoxide converting catalyst layer having a parallelepiped outer shape and arranged to abut against the intermediate cooling device for the carbon monoxide converting catalyst layer;
    a carbon monoxide selective oxidizing catalyst layer having a parallelepiped outer shape and arranged to abut against the cooling device for cooling the inlet gas of the carbon monoxide selective oxidizing catalyst layer; and
    a cooling device for cooling the outlet port of the carbon monoxide selective oxidizing catalyst layer having a parallelepiped outer shape and arranged close to the carbon monoxide selective oxidizing catalyst layer;
    wherein the reforming gas coming from the reformer is allowed to flow through the cooling device for cooling the inlet gas of carbon monoxide converting catalyst layer, the first stage carbon monoxide converting catalyst layer, the intermediate cooling device for the carbon monoxide converting catalyst layer, the second stage carbon monoxide converting catalyst layer, the cooling device for cooling the inlet gas of the carbon monoxide selective oxidizing catalyst layer, the carbon monoxide selective oxidizing catalyst layer, and the cooling device for cooling the outlet port of the carbon monoxide selective oxidizing catalyst layer in the order mentioned.

13. A fuel reforming apparatus for a polymer electrolyte membrane fuel cell, comprising:
    a burner space chamber having a high temperature combustion gas introduced thereinto and including a cylinder portion;
    a constituting member of a gas flowing passageway arranged within the burner space chamber, forming a radiation heat transmitting section for transmitting the heat of the combustion gas by means of the radiation heat transmission and a convection heat transmitting section by forming a combustion gas flowing passageway between the radiation heat transmitting section and the cylinder portion, forming a space within which an evaporator is arranged, inhibiting the flow of the combustion gas therethrough, and producing a heat insulating function;
    an evaporator arranged within the evaporator-arranging space of the gas flowing passageway-constituting member for allowing a fuel gas of a high temperature flowing through the convection heat transmitting section to flow along the outer circumferential surface of the evaporator so as to convert the water flowing within the evaporator into steam;
    an exhaust gas flowing passageway formed within the burner space chamber in a manner to extend through the wall defining the evaporator for introducing the burner exhaust gas present around the evaporator to a desired position outside the burner space chamber; and
    a reformer capable of taking out the reforming gas containing carbon monoxide, which is obtained by a reforming reaction carried by allowing a mixed fuel prepared by mixing a reforming fuel with steam to flow through the reforming catalyst layer, to the outside and having at least a part of the outer circumferential surface shaped to form an arcuate surface.

14. A fuel reforming apparatus for a polymer electrolyte membrane fuel cell according to claim 13, further comprising a partition wall arranged within the burner space chamber in a manner to partition the evaporator from the exhaust gas flowing passageway for introducing the combustion gas present between the gas flowing passageway-constituting member and the cylinder portion of the burner space chamber first into the surroundings of the evaporator and, then, into the exhaust gas introducing pipe.

15. A fuel reforming apparatus for a polymer electrolyte membrane fuel cell, comprising:

a reformer capable of taking out the reforming gas containing carbon monoxide, which is obtained by a reforming reaction carried by allowing a mixed fuel prepared by mixing a reforming fuel with steam to flow through the reforming catalyst layer, to the outside;

a carbon monoxide converter for taking in the carbon monoxide coming from the reformer so as to lower the carbon monoxide concentration by an aqueous gas shift reaction; and a carbon monoxide selective oxidizing reactor equipped with a cooling device for the carbon monoxide carbon monoxide selective oxidizing catalyst layer for cooling the carbon monoxide selective oxidizing catalyst layer and the catalyst layer, taking in the reforming gas having the carbon monoxide concentration lowered by the carbon monoxide converter into the carbon monoxide selective oxidizing catalyst layer, and mixing the air, oxygen or a combustion gas with the reforming gas so as to carry out an oxidizing reaction, thereby lowering the carbon monoxide concentration;

wherein the carbon monoxide selective oxidizing catalyst layer is divided into at least two sections, and a part of the cooling water of the fuel cell stack is supplied as the cooling medium used in an inlet cooling device, an outlet cooling device and an intermediate cooling device for cooling the carbon monoxide selective oxidizing catalyst layer arranged on the inlet side, the outlet side and in the intermediate position between the inlet side and the outlet side in each of the divided section of the carbon monoxide selective oxidizing catalyst layer.

* * * * *